(12) United States Patent
Kimura et al.

(10) Patent No.: US 8,340,220 B2
(45) Date of Patent: Dec. 25, 2012

(54) RECEIVER, INTEGRATED CIRCUIT, DIGITAL TELEVISION RECEIVER, RECEPTION METHOD, AND RECEPTION PROGRAM

(75) Inventors: Tomohiro Kimura, Osaka (JP); Ryosuke Mori, Osaka (JP)

(73) Assignee: Panasonic Corporation, Osaka (JP)

( * ) Notice: Subject to any disclaimer, the term of this patent is extended or adjusted under 35 U.S.C. 154(b) by 361 days.

(21) Appl. No.: 12/602,672

(22) PCT Filed: Apr. 8, 2009

(86) PCT No.: PCT/JP2009/001640
§ 371 (c)(1),
(2), (4) Date: Dec. 29, 2009

(87) PCT Pub. No.: WO2009/125592
PCT Pub. Date: Oct. 15, 2009

(65) Prior Publication Data
US 2010/0177251 A1    Jul. 15, 2010

(30) Foreign Application Priority Data
Apr. 11, 2008 (JP) ................................. 2008-103314

(51) Int. Cl.
*H03K 9/00* (2006.01)
*H04L 27/00* (2006.01)
(52) U.S. Cl. ......................... 375/316; 375/340; 348/725
(58) Field of Classification Search .................. 375/224, 375/316, 340, 343, 350; 348/725, 729
See application file for complete search history.

(56) References Cited

U.S. PATENT DOCUMENTS

| | | | |
|---|---|---|---|
| 7,016,651 B1 * | 3/2006 | Narasimhan | 455/67.11 |
| 7,599,663 B1 * | 10/2009 | Narasimhan | 455/67.11 |
| 7,860,183 B2 * | 12/2010 | Maltsev et al. | 375/267 |
| 8,031,814 B2 * | 10/2011 | Hwang et al. | 375/340 |
| 2002/0196880 A1 * | 12/2002 | Koslov | 375/349 |
| 2004/0190560 A1 * | 9/2004 | Maltsev et al. | 370/503 |

(Continued)

FOREIGN PATENT DOCUMENTS

JP        10-75226        3/1998

(Continued)

OTHER PUBLICATIONS

Hoeher, P. et al., Two-Dimensional Pilot-Symbol-Aided Channel Estimation by Wiener Filtering, *IEEE Xplore* (1997), pp. 1845-1848.

(Continued)

*Primary Examiner* — Jean B Corrielus
(74) *Attorney, Agent, or Firm* — Wenderoth Lind & Ponack, L.L.P.

(57) ABSTRACT

A receiver receives an OFDM signal and performs the Fourier transform on the received OFDM signal. In the receiver, a first channel estimation subunit estimates channel characteristics at SP signal positions and interpolates the estimated channel characteristics in the time direction, whereas a second channel estimation subunit estimates channel characteristics at TMCC signal positions. A correlation calculation subunit performs an autocorrelation calculation on the output from the first channel estimation subunit, and performs a cross-correlation calculation on the output from the first channel estimation subunit and the output from the second channel estimation subunit. By using the results of the autocorrelation calculation and the cross-correlation calculation performed by the correlation calculation subunit, a control subunit controls a transfer function of an interpolation filter in a frequency interpolation subunit.

15 Claims, 16 Drawing Sheets

U.S. PATENT DOCUMENTS

| | | | |
|---|---|---|---|
| 2005/0105647 A1 | 5/2005 | Wilhelmsson et al. | |
| 2005/0213679 A1 | 9/2005 | Yamagata | |
| 2005/0213680 A1 | 9/2005 | Atungsiri et al. | |
| 2005/0265489 A1* | 12/2005 | Chang et al. | 375/340 |
| 2006/0050774 A1 | 3/2006 | De Marchi | |
| 2006/0215537 A1* | 9/2006 | Wu et al. | 370/208 |
| 2008/0049598 A1* | 2/2008 | Ma et al. | 370/208 |
| 2008/0117997 A1* | 5/2008 | Maltsev et al. | 375/267 |
| 2008/0175328 A1* | 7/2008 | Lin et al. | 375/260 |
| 2009/0207956 A1 | 8/2009 | Kimura et al. | |
| 2011/0135036 A1* | 6/2011 | Andgart et al. | 375/316 |
| 2011/0182340 A1* | 7/2011 | Primo et al. | 375/224 |

FOREIGN PATENT DOCUMENTS

| | | |
|---|---|---|
| JP | 2001-308760 | 11/2001 |
| JP | 2005-527153 | 9/2005 |
| JP | 2005-286636 | 10/2005 |
| JP | 2005-287043 | 10/2005 |
| JP | 2005-312027 | 11/2005 |
| JP | 2006-311385 | 11/2006 |
| JP | 2007-511942 | 5/2007 |
| WO | 2008/023539 | 2/2008 |
| WO | 2008/129825 | 10/2008 |

OTHER PUBLICATIONS

Arib Standard, Transmission System for Digital Terrestrial Television Broadcasting, Association of Radio Industries and Businesses, Version 1.6-E2 (Nov. 30, 2005).

International Search Report issued Jun. 30, 2009 in International (PCT) Application No. PCT/JP2009/001640.

"Transmission System for Digital Terrestrial Sound Broadcasting, ARBI Standard, ARBI STD-B29 Ver. 2.2" with Verification of Translation and partial translation of Chapters 3.12.2 and 3.142, dated Nov. 30, 2005.

* cited by examiner

RECEIVER, INTEGRATED CIRCUIT, DIGITAL TELEVISION RECEIVER, RECEPTION METHOD, AND RECEPTION PROGRAM

BACKGROUND OF INVENTION

1. Technical Field

The present invention relates to a channel estimation technique that is used to perform demodulation processing on a transmission signal generated by multiplexing a plurality of modulated carriers.

2. Background Art

With the ability to efficiently use frequency, an Orthogonal Frequency-Division Multiplexing (OFDM) method is a transmission system suitable for high-speed data communication. The OFDM method is also a digital multi-carrier transmission system utilized as a Japanese digital terrestrial broadcasting system (Integrated Services Digital Broadcasting-Terrestrial transmission, ISDB-T) and a European digital terrestrial broadcasting system (Digital Video Broadcasting-Terrestrial transmission, DVB-T) (for example, see Non-patent Documents 1 and 2).

In the OFDM method, after complex signals are allocated to a plurality of mutually orthogonal sub-carriers, a transmission signal is generated by performing the inverse fast Fourier transform on the modulated carriers in each predetermined symbol duration, then the generated transmission signal is transmitted. In the ISDB-T and DVB-T systems, a signal called a guard interval is inserted into the transmission signal for the purpose of guarding against the InterSymbol Interference (ISI) caused by multipath, Signal Frequency Network (SFN), and the like.

In the ISDB-T system, signals such as scattered pilot signals, control signals, additional signals and continual pilot signals are allocated to certain carriers and transmitted along with data. The amplitudes and phases of the scattered pilot signals, which are used as references for equalization, are known to a receiver. The control signals are called Transmission and Multiplexing Configuration Control (TMCC) and transmit information on transmission parameters and the like. The additional signals are called Auxiliary Channel (AC) and transmit additional information. The amplitudes and phases of the continual pilot signals are known to the receiver.

In the DVB-T system, signals such as scattered pilot signals, control signals and continual pilot signals are allocated to certain carriers and transmitted along with data. The amplitudes and phases of the scattered pilot signals, which are used as references for equalization, are known to the receiver. The control signals are called Transmission Parameters Signalling (TPS) and transmit information on transmission parameters and the like. The amplitudes and phases of the continual pilot signals are known to the receiver.

The receiver extracts, from the received OFDM signal, a portion having a useful symbol length, and performs the Fourier transform on the extracted portion. This process transforms the stated portion having the useful symbol length, which is a time domain OFDM signal, into a frequency domain OFDM signal. However, as the received OFDM signal has been affected by channel distortion, it is necessary to remove such channel distortion from the frequency domain OFDM signal. The processing of removing the channel distortion is called equalization or channel equalization. In equalization, channel characteristics are estimated by using scattered pilot signals included in the frequency domain OFDM signal, then the channel distortion is removed by using the estimated channel characteristics.

With reference to FIGS. 17(a), 17(b) and 17(c), a description is now given of channel estimation processing that is performed with use of scattered pilot signals (hereinafter, "SP signals") in an exemplary case where the ISDB-T system is used.

As shown in FIG. 17(a), the SP signals are allocated as follows in the ISDB-T system. In each symbol, an SP signal is allocated to every 12th carrier in the carrier (frequency) direction. In each carrier, an SP signal is allocated to every 4th symbol in the symbol (time) direction. A channel estimation unit included in the receiver (i) extracts SP signals from the frequency domain OFDM signal, (ii) generates SP signals that are identical to SP signals inserted by a transmitter, (iii) divides each of the extracted SP signals by a corresponding one of the generated SP signals, and (iv) considers each result of this division as an estimated value of channel characteristics (hereafter, "an estimated channel characteristics value") at a corresponding one of SP signal positions. Then, the channel estimation unit interpolates, in the symbol (time) direction, the estimated channel characteristics values at the SP signal positions as shown in FIG. 17(b). Thereafter, the channel estimation unit interpolates, in the carrier (frequency) direction, each of the estimated channel characteristics values at a corresponding one of symbol positions in each carrier to which an SP signal is allocated using a certain symbol as shown in FIG. 17(c). This way, an estimated channel characteristics value is obtained for every cell in each carrier and each symbol.

Generally, interpolation in the frequency direction is performed by using an interpolation filter. Before performing the interpolation by using the interpolation filter, estimated channel characteristics values are obtained only for every 3rd carrier. As a result, the estimated channel characteristics values include an aliasing component at intervals of Tu/3 as shown in FIG. 18, where Tu denotes a useful symbol duration. Here, the best transfer function of the interpolation filter allows more signal components, including signal components originating from multipath and SFN, to pass through the interpolation filter, thus removing more noise components. However, as channel status varies between different channels, the best transfer function cannot be uniquely determined. In view of this, if the transfer function of the interpolation filter is controlled in accordance with channel status, then the accuracy of channel estimation will be improved. Note, Non-patent Document 3 provides a discussion on the best filter as well as interpolation in the time direction.

Methods of controlling the transfer function of an interpolation filter in the frequency direction have been disclosed in the prior art. For example, Patent Document 1 discloses a method of controlling the transfer function of an interpolation filter by using an estimated value of a channel response, and Patent Document 2 discloses a method of controlling the transfer function of an interpolation filter by using signal qualities.

CITATION LIST

Patent Literature

[Patent Literature 1]

Japanese Patent Application Publication No. 2005-312027

[Patent Literature 2]

Japanese Patent Application Publication No. 2006-311385

Non-Patent Literature

[Non-Patent Literature 1]
ARIB Standard, "Transmission System for Digital Terrestrial Television Broadcasting," ARIB STD-B31
[Non-Patent Literature 2]
ARIB Standard, "Transmission System for Digital Terrestrial Sound Broadcasting," ARIB STD-B29
[Non-Patent Literature 3]
P. Hoeher, S. Kaiser, P. Robertson. "Two-Dimensional Pilot-Symbol-Aided Channel Estimation by Wiener Filtering."Acoustics, Speech, and Signal Processing (ICASSP '97), the IEEE International Conference on Volume 3, Apr. 21-24, 1997. Pages: 1845-1848. Vol. 3, Digital Object Identifier 10. 1109/ICASSP. 1997.

SUMMARY OF INVENTION

However, in order to control the transfer function based on channel status (a channel response) as disclosed in Patent Document 1, use of a channel response estimator is required. Although Patent Document 1 does not provide an in-depth discussion of channel response estimation, it suggests use of a guard interval adapted matched filter. The drawback of Patent Document 1 is that update processing is generally required for each delay tap, which contributes to a large calculation amount. Although it is possible to perform processing of (i) estimating a channel response in the frequency domain and (ii) estimating a channel response in the time domain by performing the inverse Fourier transform on the estimated channel response, performing the inverse Fourier transform would also contribute to a large calculation amount.

The method of Patent Document 2 does not estimate channel status, but selects, from among a plurality of candidates for the interpolation filter, an interpolation filter that offers the best signal quality after equalization. Use of this method does not require a channel response estimator, but does require (i) equalization to be actually performed and (ii) detection of signal qualities. This contributes to a large calculation amount.

However, it is of great importance to note that, as is the case with interpolation in the frequency direction, if an interpolation filter is used for interpolation in the time direction, the accuracy of channel estimation can be improved by controlling the transfer function of the interpolation filter in accordance with channel status. Reduction in the scale of calculation required to perform the aforementioned control carries great significance as well.

With the above in mind, the present invention aims to provide a receiver, an integrated circuit, a digital television receiver, a reception method, and a reception program that can reduce the scale of calculation required to control the transfer function of an interpolation filter that interpolates estimated channel characteristics values.

To achieve the above aim, the present invention provides a receiver that receives a transmission signal, which has been generated by multiplexing a plurality of modulated carriers, and demodulates the received transmission signal, the receiver comprising: a Fourier transform unit operable to (i) perform Fourier transform on the received transmission signal and (ii) output the transformed transmission signal; a first channel estimation unit operable to (i) estimate channel characteristics based on first signals included in the transformed transmission signal, and (ii) output the estimated channel characteristics as first output signals; a second channel estimation unit operable to (i) estimate channel characteristics based on second signals included in the transformed transmission signal, and (ii)) output the estimated channel characteristics as second output signals; an interpolation unit operable to interpolate the first output signals by performing, on the first output signals, filter processing according to a controlled transfer function; a correlation calculation unit operable to perform correlation calculations on the first output signals and the second output signals; and a control unit operable to control the transfer function of the interpolation unit in accordance with results of the correlation calculations.

The present invention also provides an integrated circuit that receives a transmission signal, which has been generated by multiplexing a plurality of modulated carriers, and demodulates the received transmission signal, the integrated circuit comprising: a Fourier transform unit operable to (i) perform Fourier transform on the received transmission signal and (ii) output the transformed transmission signal; a first channel estimation unit operable to (i) estimate channel characteristics based on first signals included in the transformed transmission signal, and (ii) output the estimated channel characteristics as first output signals; a second channel estimation unit operable to (i) estimate channel characteristics based on second signals included in the transformed transmission signal, and (ii) output the estimated channel characteristics as second output signals; an interpolation unit operable to interpolate the first output signals by performing, on the first output signals, filter processing according to a controlled transfer function; a correlation calculation unit operable to perform correlation calculations on the first output signals and the second output signals; and a control unit operable to control the transfer function of the interpolation unit in accordance with results of the correlation calculations.

The present invention also provides a digital television receiver that receives a transmission signal, which has been generated by multiplexing a plurality of modulated carriers, and demodulates the received transmission signal, the digital television receiver comprising: a Fourier transform unit operable to (i) perform Fourier transform on the received transmission signal and (ii) output the transformed transmission signal; a first channel estimation unit operable to (i) estimate channel characteristics based on first signals included in the transformed transmission signal, and (ii) output the estimated channel characteristics as first output signals; a second channel estimation unit operable to (i) estimate channel characteristics based on second signals included in the transformed transmission signal, and (ii) output the estimated channel characteristics as second output signals; an interpolation unit operable to interpolate the first output signals by performing, on the first output signals, filter processing according to a controlled transfer function; a correlation calculation unit operable to perform correlation calculations on the first output signals and the second output signals; and a control unit operable to control the transfer function of the interpolation unit in accordance with results of the correlation calculations.

The present invention also provides a reception method used in a receiver that receives a transmission signal, which has been generated by multiplexing a plurality of modulated carriers, and demodulates the received transmission signal, the reception method comprising the steps of: performing Fourier transform on the received transmission signal, and outputting the transformed transmission signal; estimating channel characteristics based on first signals included in the transformed transmission signal, and outputting the estimated channel characteristics as first output signals; estimating channel characteristics based on second signals included in the transformed transmission signal, and outputting the estimated channel characteristics as second output signals;

interpolating the first output signals by performing, on the first output signals, filter processing according to a controlled transfer function; performing correlation calculations on the first output signals and the second output signals; and controlling the transfer function associated with the interpolating step in accordance with results of the correlation calculations.

The present invention also provides a program for causing a receiver, which (i) receives a transmission signal generated by multiplexing a plurality of modulated carriers and (ii) demodulates the received transmission signal, to execute the steps of: performing Fourier transform on the received transmission signal, and outputting the transformed transmission signal; estimating channel characteristics based on first signals included in the transformed transmission signal, and outputting the estimated channel characteristics as first output signals; estimating channel characteristics based on second signals included in the transformed transmission signal, and outputting the estimated channel characteristics as second output signals; interpolating the first output signals by performing, on the first output signals, filter processing according to a controlled transfer function; performing correlation calculations on the first output signals and the second output signals; and controlling the transfer function associated with the interpolating step in accordance with results of the correlation calculations.

Each of the above receiver, integrated circuit, digital television receiver, reception method and reception program allows reducing the scale of calculations, by controlling the transfer function with use of the results of the correlation calculations performed on (i) values of the estimated channel characteristics that are based on the first signals, and (ii) values of the estimated channel characteristics that are based on the second signals.

The above receiver may be structured such that (i) the correlation calculation unit includes: an autocorrelation calculation subunit operable to (a) calculate autocorrelations of the first output signals and (b) output autocorrelation signals indicating results of the autocorrelation calculation; and a cross-correlation calculation subunit operable to (a) calculate cross-correlations of the first output signals and the second output signals and (b) output cross-correlation signals indicating results of the cross-correlation calculation, and (ii) the control unit controls the transfer function of the interpolation unit in accordance with the autocorrelation signals and the cross-correlation signals.

The above structure makes it possible to perform the control over the transfer function which cannot be performed by using only the autocorrelations.

In the above receiver, the control unit may include: an interpolation filter evaluation subunit operable to (i) estimate, in one-to-one correspondence with a plurality of candidate transfer functions, powers of signals output from the interpolation unit by using the autocorrelation signals and the cross-correlation signals, and (ii) output each of the estimated powers; and a largest value detection subunit operable to (i) detect a largest estimated power from among the estimated powers output from the interpolation filter evaluation subunit, and (ii) control the transfer function of the interpolation unit in accordance with the candidate transfer function corresponding to the detected largest estimated power.

According to the above structure, the transfer function is controlled so as to maximize the power output from the interpolation unit, with the result that a larger amount of signals can be output from the interpolation unit. The above structure can thereby improve the accuracy of estimating channel characteristics output from the interpolation unit.

In the above receiver, the control unit may include: a first filter subunit operable to (i) perform filter processing on the autocorrelation signals according to each of a plurality of candidate transfer functions, and (ii) output the filtered autocorrelation signals in one-to-one correspondence with the plurality of candidate transfer functions; a second filter subunit operable to (i) perform filter processing on the cross-correlation signals according to each of the plurality of candidate transfer functions, and (ii) output the filtered cross-correlation signals in one-to-one correspondence with the plurality of candidate transfer functions; an error calculation subunit operable to (i) calculate, in one-to-one correspondence with the plurality of candidate transfer functions, errors in signals output from the interpolation unit by using the filtered autocorrelation signals and the filtered cross-correlation signals, and (ii) output the calculated errors; and a smallest value detection subunit operable to (i) detect a smallest error from among the calculated errors output from the error calculation subunit, and (ii) control the transfer function of the interpolation unit in accordance with the candidate transfer function corresponding to the detected smallest error.

The above structure controls the transfer function so as to minimize an error in the output signals from the interpolation unit, thus improving the accuracy of estimating channel characteristics output from the interpolation unit.

The above receiver may be structured such that (i) the correlation calculation unit includes: a coefficient multiplication subunit operable to (a) multiply the first output signals by coefficients based on a reference transfer function of the interpolation unit, and (b) output the multiplied first signals; an autocorrelation calculation subunit operable to (a) calculate autocorrelations of the multiplied first output signals and (b) output autocorrelation signals indicating results of the autocorrelation calculation; and a cross-correlation calculation subunit operable to (a) calculate cross-correlations of the multiplied first output signals and the second output signals and (b) output cross-correlation signals indicating results of the cross-correlation calculation, and (ii) the control unit controls the transfer function of the interpolation unit in accordance with the autocorrelation signals and the cross-correlation signals.

In the above receiver, the control unit may include: a first rotation operation subunit operable to (i) perform rotation operations on the autocorrelation signals in accordance with each of a plurality of candidate rotational amounts, and (ii) output the rotated autocorrelation signals in one-to-one correspondence with the plurality of candidate rotational amounts; a first accumulation subunit operable to accumulate the rotated autocorrelation signals in one-to-one correspondence with the plurality of candidate rotational amounts; a second rotation operation subunit operable to (i) perform rotation operations on the cross-correlation signals in accordance with each of the plurality of candidate rotational amounts, and (ii) output the rotated cross-correlation signals in one-to-one correspondence with the plurality of candidate rotational amounts; a second accumulation operation subunit operable to accumulate the rotated cross-correlation signals in one-to-one correspondence with the plurality of candidate rotational amounts; an error calculation subunit operable to (i) calculate, in one-to-one correspondence with the plurality of candidate rotational amounts, errors in signals output from the interpolation unit by using (a) the rotated autocorrelation signals that have been accumulated and output by the first accumulation subunit, and (b) the rotated cross-correlation signals that have been accumulated and output by the second accumulation subunit, and (ii) output the calculated errors; and a smallest value detection subunit operable to (i) detect a smallest error from among the errors output from the error calculation subunit, and (ii) control the transfer function of the interpolation unit by controlling a central position of the reference transfer function of the interpolation unit in accordance with the candidate rotational amount corresponding to the detected smallest error.

The above structures control the transfer function so as to minimize an error in the signals output from the interpolation unit, thus improving the accuracy of estimating channel characteristics output from the interpolation unit.

In the above receiver, the first channel estimation unit may include a pilot estimation subunit operable to (i) estimate channel characteristics at first signal positions in accordance with the first signals included in the transmission signal, and (ii) output the estimated channel characteristics at the first signal positions.

In the above receiver, the first channel estimation unit may further include a time interpolation subunit operable to (i) interpolate, in a time direction, the estimated channel characteristics at the signal positions of the first signals, and (ii) output results of the interpolation as the first output signals.

The above-described first signals may be scattered pilot signals.

With the above structures, the receiver is directly applicable to, for example, the ISDB-T system, the DVB-T system and the DVB-T2 system.

The above-described second signals may be one of (i) TMCC signals, (ii) AC signals, (iii) TPS signals, and (iv) continual pilot signals.

The above-described second signals may include one of the following sets (i) through (v): (i) TMCC signals and AC signals; (ii) TMCC signals and continual pilot signals; (iii) AC signals and continual pilot signals; (iv) TMCC signals, AC signals and continual pilot signals; and (v) TPS signals and continual pilot signals.

With the above structures, the receiver is directly applicable to, for example, the ISDB-T system, the DVB-T system and the DVB-T2 system.

The present invention also provides a receiver that receives a transmission signal, which has been generated by multiplexing a plurality of modulated carriers, and demodulates the received transmission signal, the receiver comprising: a Fourier transform unit operable to (i) perform Fourier transform on the received transmission signal and (ii) output the transformed transmission signal; and a channel estimation unit operable to (i) estimate channel characteristics in accordance with the transformed transmission signal and (ii) output the estimated channel characteristics, wherein a transfer function of the channel estimation unit is controlled in accordance with correlations of values of the estimated channel characteristics.

The above receiver can reduce the scale of calculations by controlling the transfer function with use of the results of performing correlation calculations on values of estimated channel characteristics.

DETAILED DESCRIPTION OF INVENTION

The following describes the embodiments of the present invention which are exemplarily applied to a receiver that receives an OFDM transmission signal generated and wirelessly transmitted in accordance with the OFDM transmission system.

First Embodiment

The following describes First Embodiment of the present invention with reference to the accompanying drawings.

<Structure and Operations of Reception Device>

Figure 1:
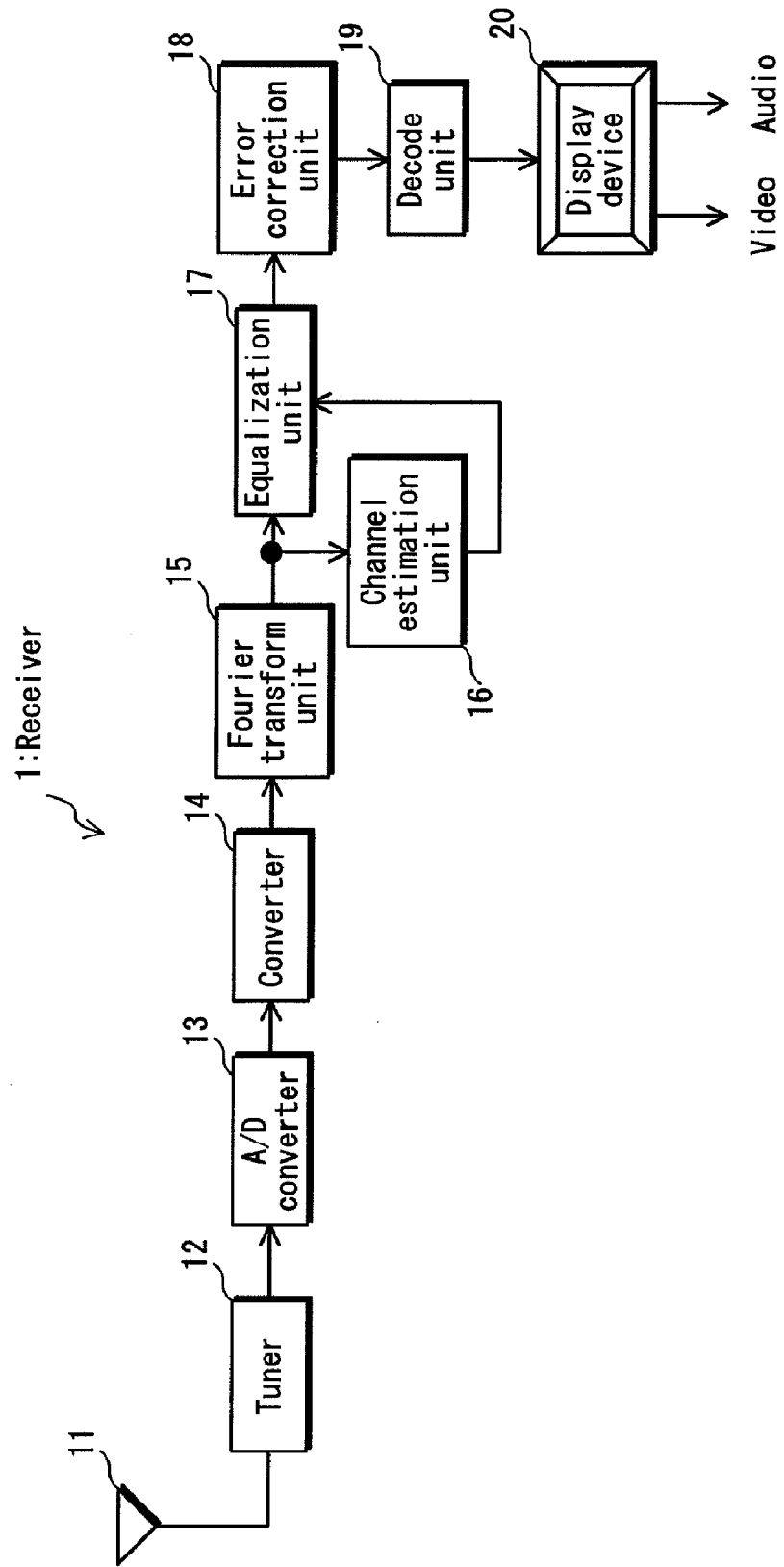
FIG. 1 is a structural diagram of a receiver pertaining to First Embodiment.

FIG. 1 is a structural diagram of a receiver pertaining to the present embodiment. It should be mentioned here that the structure of the receiver shown in FIG. 1 is also the structure of a digital television receiver compliant with the ISDB-T system.

A receiver 1 is composed of an antenna 11, a tuner 12, an analog-to-digital (A/D) converter 13, a converter 14, a Fourier transform unit 15, a channel estimation unit 16, an equalization unit 17, an error correction unit 18, a decode unit 19, and a display device 20.

The antenna 11 receives OFDM signals transmitted by broadcast stations (not illustrated), and outputs the received OFDM signals to the tuner 12. The tuner 12 tunes to a desired OFDM signal from among the OFDM signals input from the antenna 11, and outputs the desired OFDM signal to the A/D converter 13. The A/D converter 13 converts the OFDM signal input from the tuner 12, which is an analog signal, into a digital signal, and outputs the digital OFDM signal to the converter 14. The converter 14(i) performs frequency conversion, rate conversion, etc. on the OFDM signal input from the A/D converter 13, (ii) reproduces the OFDM signal, which is a time domain OFDM signal, and (iii) outputs the reproduced OFDM signal to the Fourier transform unit 15.

The Fourier transform unit 15 (i) transforms the time domain OFDM signal into a frequency domain OFDM signal by performing the Fourier transform on the OFDM signal input from the converter 14 on a per-symbol basis, and (ii) outputs the frequency domain OFDM signal to the channel estimation unit 16 and the equalization unit 17. Note, high-speed calculation can be realized here by using the fast Fourier transform as the Fourier transform.

The channel estimation unit 16 (i) estimates channel characteristics based on the frequency domain OFDM signal input from the Fourier transform unit 15, and (ii) outputs values of the estimated channel characteristics (estimated channel characteristics values) to the equalization unit 17. The equalization unit 17 (i) equalizes the OFDM signal input from the Fourier transform unit 15 by using the estimated channel characteristics values input from the channel estimation unit 16, and (ii) outputs the OFDM signal, which has been reproduced by the equalization, to the error correction unit 18. The channel estimation unit 16 is described in greater detail below, with reference to FIGS. 2 to 9.

The error correction unit 18 (i) performs error correction on the OFDM signal input from the equalization unit 17, (ii) converts data obtained as a result of performing the error correction into, for example, MPEG-TS digital data, and (iii) outputs the MPEG-TS digital data to the decode unit 19. The decode unit 19 (i) converts the MPEG-TS digital data input from the error correction unit 18 into a video signal and an audio signal, and (ii) outputs the video signal and the audio signal to the display device 20. The display device 20 displays a video based on the video signal input from the decode unit 19, and outputs audio based on the audio signal input from the decode unit 19.

<Structure and Operations of Channel Estimation Unit>

Figure 2:
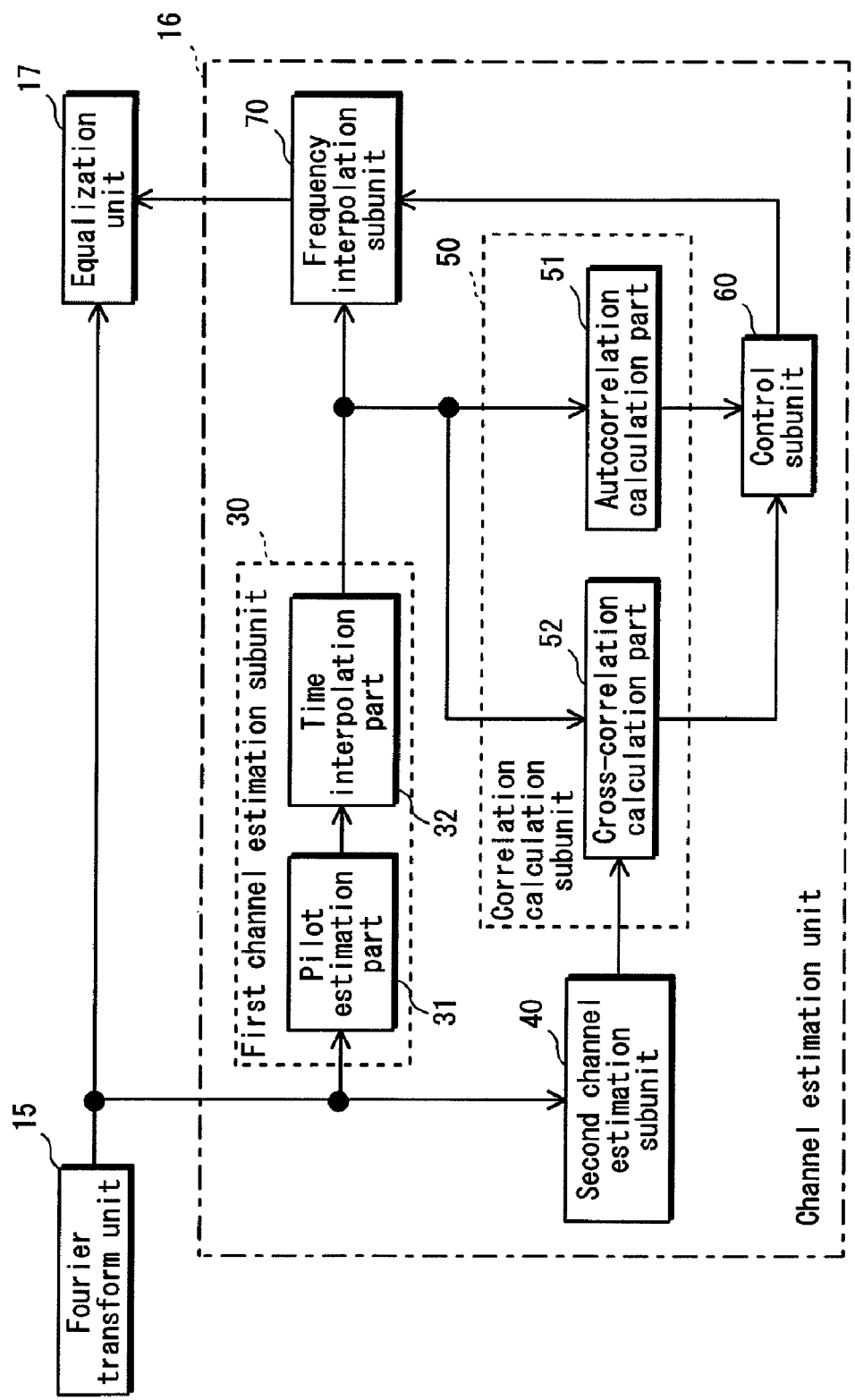
FIG. 2 is a structural diagram of a channel estimation unit shown in FIG. 1.

FIG. 2 is a structural diagram of the channel estimation unit 16 shown in FIG. 1. In FIG. 2, the Fourier transform unit 15 and the equalization unit 17 are also illustrated to clearly convey how the internal elements of the channel estimation unit 16 are connected thereto.

The channel estimation unit 16 includes a first channel estimation subunit 30, a second channel estimation subunit 40, a correlation calculation subunit 50, a control subunit 60, and a frequency interpolation subunit 70.

The first channel estimation subunit 30 includes a pilot estimation part 31 and a time interpolation part 32. Based on the scattered pilot signals (SP signals) included in the OFDM signal input from the Fourier transform unit 15, the pilot estimation part 31 estimates channel characteristics at the SP signal positions (see FIG. 17(a)), and outputs the estimated channel characteristics values to the time interpolation part 32. The time interpolation part 32 interpolates, in the time direction, the estimated channel characteristics values at the SP signal positions, which have been input from the pilot estimation part 31 (see FIG. 17(b)). The time interpolation part 32 then outputs the results of this interpolation to (i) an autocorrelation calculation part 51 and a cross-correlation calculation part 52 (both described later) included in the correlation calculation subunit 50 and (ii) the frequency interpolation subunit 70.

Figure 3:
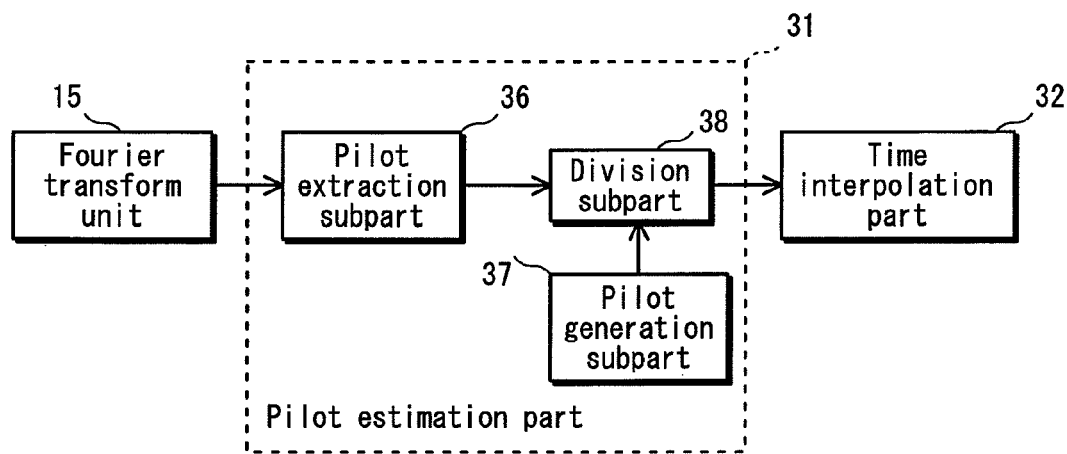
FIG. 3 is a structural diagram of a pilot estimation part shown in FIG. 2.

Described below, with reference to FIG. 3, are the structure and operations of the pilot estimation part 31. FIG. 3 is a structural diagram of the pilot estimation part 31 shown in FIG. 2. In FIG. 3, the Fourier transform unit 15 and the time interpolation part 32 are also illustrated to clearly convey how the internal elements of the pilot estimation part 31 are connected thereto.

The pilot estimation part 31 includes a pilot extraction subpart 36, a pilot generation subpart 37, and a division subpart 38. The pilot extraction subpart 36 and the pilot generation subpart 37 can perform the following processing because the amplitudes, phases and positions of SP signals generated by a transmitter are known to the receiver.

The pilot extraction subpart 36 extracts SP signals from the frequency domain OFDM signal input from the Fourier transform unit 15, and outputs the extracted SP signals to the division subpart 38. The pilot generation subpart 37 generates SP signals that have the same amplitudes and phases as the SP signals generated by the transmitter, and outputs the SP signals it has generated to the division subpart 38. The division subpart 38 divides each of the SP signals (#1) input from the pilot extraction subpart 36 by a corresponding one of the SP signals (#2) input from the pilot generation subpart 37. More specifically, each of the SP signals (#1) is divided by a corresponding one of the SP signals (#2) which has the same symbol and the same carrier. The division subpart 38 then outputs each of the results of this division to the time interpolation part 32 as an estimated channel characteristics value at a corresponding one of the SP signal positions (at the corresponding symbol and carrier).

Based on TMCC signals included in the frequency domain OFDM signal input from the Fourier transform unit 15, the second channel estimation subunit 40 estimates channel characteristics at the TMCC signal positions, and outputs the estimated channel characteristics values to the cross-correlation calculation part 52 (described later) included in the correlation calculation subunit 50.

Figure 4:
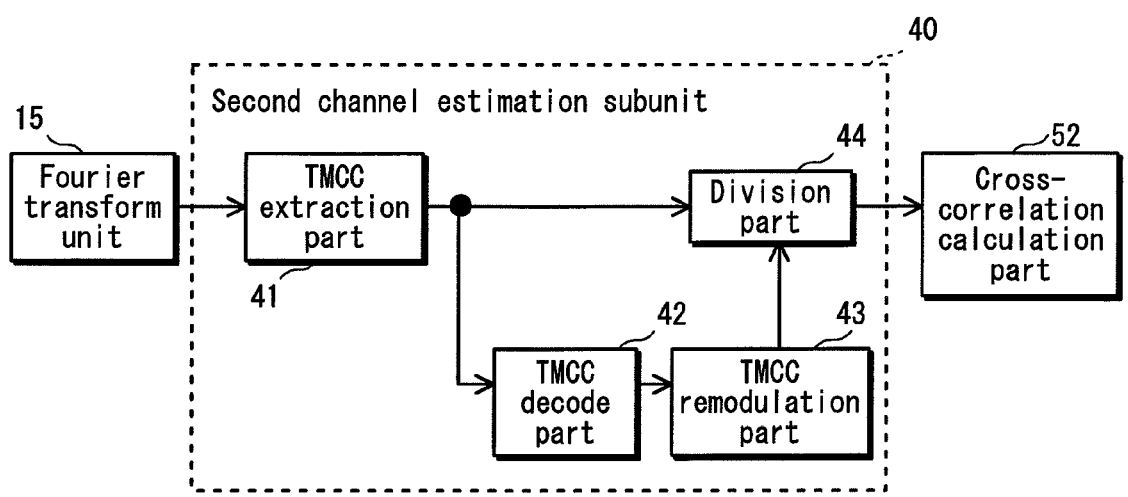
FIG. 4 is a structural diagram of a second channel estimation subunit shown in FIG. 2.

Described below, with reference to FIG. 4, are the structure and operations of the second channel estimation subunit 40. FIG. 4 is a structural diagram of the second channel estimation subunit 40 shown in FIG. 2. In FIG. 4, the Fourier transform unit 15 and the cross-correlation calculation part 52 are also illustrated to clearly convey how the internal elements of the second channel estimation subunit 40 are connected thereto.

The second channel estimation subunit 40 includes a TMCC extraction part 41, a TMCC decode part 42, a TMCC remodulation part 43 and a division part 44. The TMCC extraction part 41, the TMCC decode part 42 and the TMCC remodulation part 43 can perform the following processing because (i) the positions of the TMCC signals generated by the transmitter are known to the receiver, (ii) Differential Binary Phase-Shift Keying (DBPSK) is performed on the TMCC signals in the symbol direction, (iii) a differential reference signal that has been modulated using a known phase is allocated to the first symbol of a frame, and (iv) every TMCC signal allocated to a plurality of carriers included in one symbol carries the same control information piece.

The TMCC extraction part 41 extracts TMCC signals from the frequency domain OFDM signal input from the Fourier transform unit 15, and outputs the extracted TMCC signals to the TMCC decode part 42 and the division part 44.

The TMCC decode part 42 decodes control information pieces carried by the TMCC signals input from the TMCC extraction part 41, by performing demodulation processing corresponding to DBPSK on the TMCC signals. The TMCC decode part 42 then outputs the decoded control information pieces to the TMCC remodulation part 43. Here, every TMCC signal allocated to a plurality of carriers included in one symbol carries the same control information piece. Hence, the TMCC decode part 42 identifies control information pieces carried by the plurality of carriers included in one symbol by making a majority decision with respect thereto. This process improves the accuracy of decoding of control information pieces.

The TMCC remodulation part 43 estimates modulation phases of TMCC signals that have been modulated by the transmitter, by performing DBPSK on the control information pieces input from the TMCC decode part 42 with use of a differential reference signal allocated to the first symbol of a frame. The TMCC remodulation part 43 then outputs, to the division part 44, the signals obtained as a result of performing DBPSK.

The division part 44 divides each of the TMCC signals (#1) input from the TMCC extraction part 41 by a corresponding one of the signals (#2) input from the TMCC remodulation part 43. More specifically, each of the TMCC signals (#1) is divided by a corresponding one of the signals (#2) which has the same symbol and the same carrier. The division part 44 then outputs each of the results of this division to the cross-correlation calculation part 52 as an estimated channel characteristics value at a corresponding one of the TMCC signal positions (at the corresponding symbol and carrier).

The correlation calculation subunit 50 includes the autocorrelation calculation part 51 and the cross-correlation calculation part 52. Below, a variable included in the parentheses "( )" indicates a frequency index.

Figure 5:
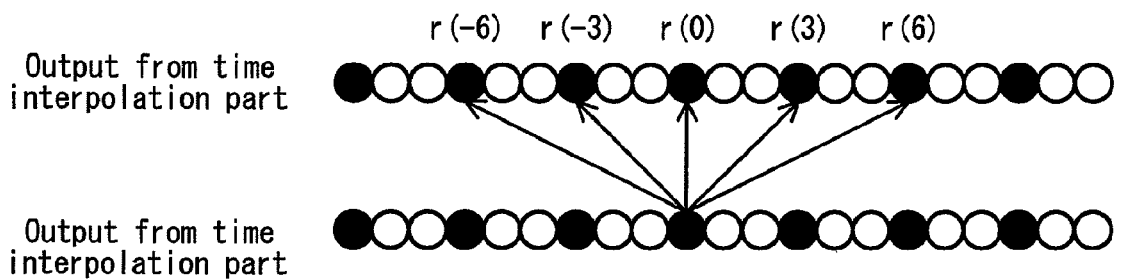
FIG. 5 shows a concept of an autocorrelation calculation performed by an autocorrelation calculation part shown in FIG. 2.

The autocorrelation calculation part 51 calculates an autocorrelation value $r_s(k)$ by performing the autocorrelation calculation of the following Equation 1 by using a corresponding estimated channel characteristics value $h_s(x)$ input from the time interpolation part 32. The autocorrelation calculation part 51 then outputs the calculated autocorrelation value $r_s(k)$ to the control subunit 60. The concept of the autocorrelation calculation is illustrated in FIG. 5. As the autocorrelation calculation is a known technique, a detailed description thereof is omitted.

$$r_s(k)=E\{h_s(x)h_s^*(x-k)\} \qquad \text{Equation 1}$$

The superscripted symbol "*" denotes a complex conjugate, and "E{ }" denotes an expected value calculation. These rules apply to the rest of this Description.

Figure 17:
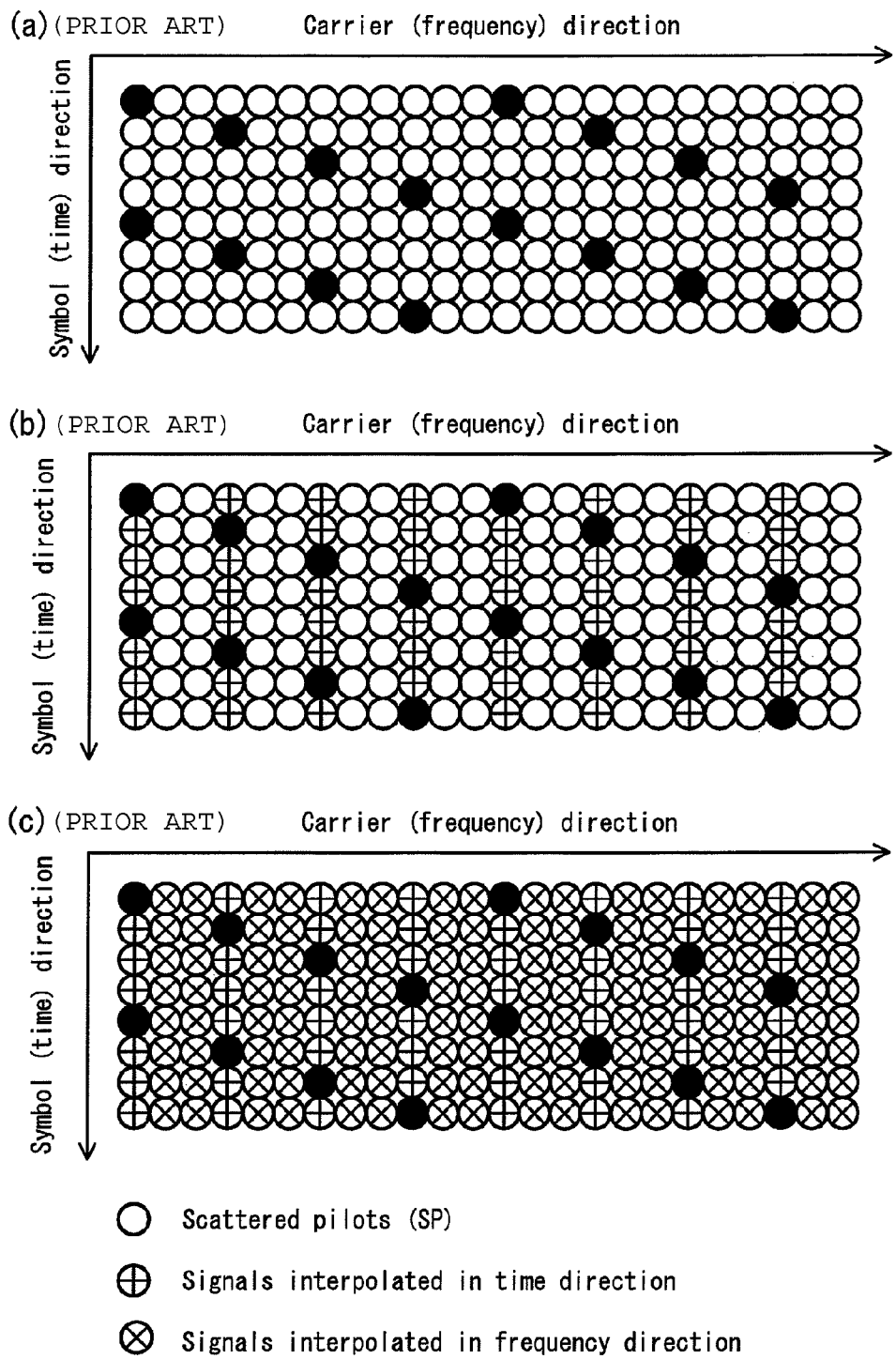
FIG. 17 is a diagram illustrating the principles of operations of a general channel estimation unit.
Figure 18:
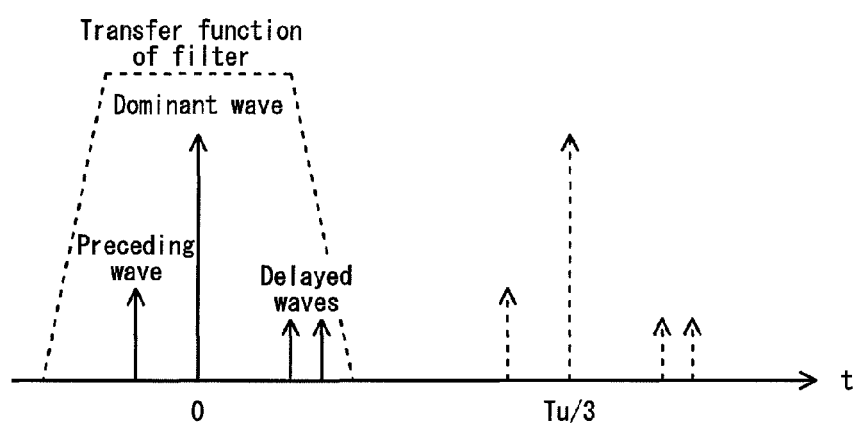
FIG. 18 is an aliasing component that appears in a signal whose estimated channel characteristics values have been interpolated only for every 3rd carrier.

The time interpolation part 32 outputs estimated channel characteristics values $h_s(x)$ for every 3rd carrier (see FIG. 17(*b*)). Accordingly, the autocorrelation calculation part 51 can calculate autocorrelation values $r_s(k)$ for every 3rd carrier. That is to say, by using Equation 1, the autocorrelation calculation part 51 can calculate an autocorrelation value $r_s(k)$ for k that satisfies the relationship k=3i (i is an integer).

Figure 6A:
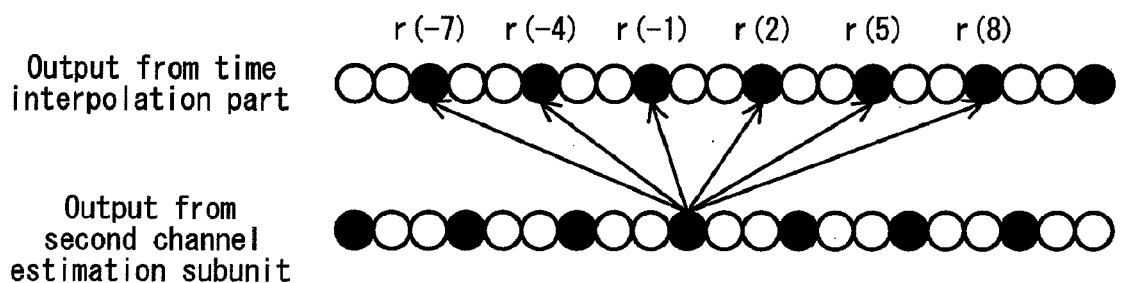
FIGS. 6A and 6B each show a concept of a cross-correlation calculation performed by a cross-correlation calculation part shown in FIG. 2.
Figure 6B:
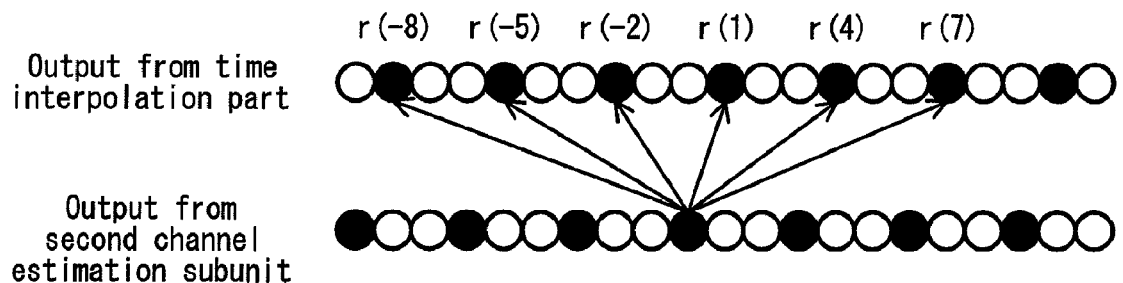

The cross-correlation calculation part 52 calculates a cross-correlation value $r_c(k)$ by performing the cross-correlation calculation of the following Equation 2 by using (i) a corresponding estimated channel characteristics value $h_s(x)$ input from the time interpolation part 32 and (ii) a corresponding estimated channel characteristics value $h_t(x)$ input from the second channel estimation subunit 40. The cross-correlation calculation part 52 then outputs the calculated cross-correlation value $r_c(k)$ to the control subunit 60. The concept of the cross-correlation calculation is illustrated in FIGS. 6A and 6B. As the cross-correlation calculation is a known technique, a detailed description thereof is omitted.

$$r_c(k)=E\{h_t(x)h_s^*(x-k)\} \qquad \text{Equation 2}$$

A plurality of TMCC signals are allocated such that their positions are different from the SP signal positions and they are as least periodic as possible. Accordingly, the cross-correlation calculation part 52 can calculate cross-correlation values $r_c(k)$ for carriers other than the above-described every 3rd carrier (i.e., for carriers in which none of the cells has an SP signal). That is to say, by using Equation 2, the cross-correlation calculation part 52 can calculate a cross-correlation value $r_c(k)$ for k that satisfies the relationship k≠3i (i is an integer).

As set forth above, given that i is an integer, an autocorrelation value $r_s(k)$ is calculated by the autocorrelation calculation part 51 for k that satisfies the relationship k=3i, and a cross-correlation value $r_c(k)$ is calculated by the cross-correlation calculation part 52 for k that satisfies the relationship k≠3i. Hence, by treating both of an autocorrelation value $r_s(k)$ and a cross-correlation value $r_c(k)$ as a correlation value r(k), the correlation calculation subunit 50 can output, to the control subunit 60, the correlation value r(k) for k that satisfies the relationship k=i.

Given that n is an integer, when an interpolation filter 71 (described later) included in the frequency interpolation subunit 70 has 2n+1 taps, the correlation calculation subunit 50 calculates correlation values r(−2n) to r(2n) and outputs the calculated correlation values r(−2n) to r(2n) to the control subunit 60.

The control subunit 60 treats both of an autocorrelation value $r_s(k)$ input from the autocorrelation calculation part 51 and a cross-correlation value $r_c(k)$ input from the cross-correlation calculation part 52 as one correlation value r(k). The control subunit 60 controls values of tap coefficients, which are used by the interpolation filter 71 when interpolating estimated channel characteristics values, so as to maximize the average power of the output signal from the interpolation filter 71.

Figure 7:
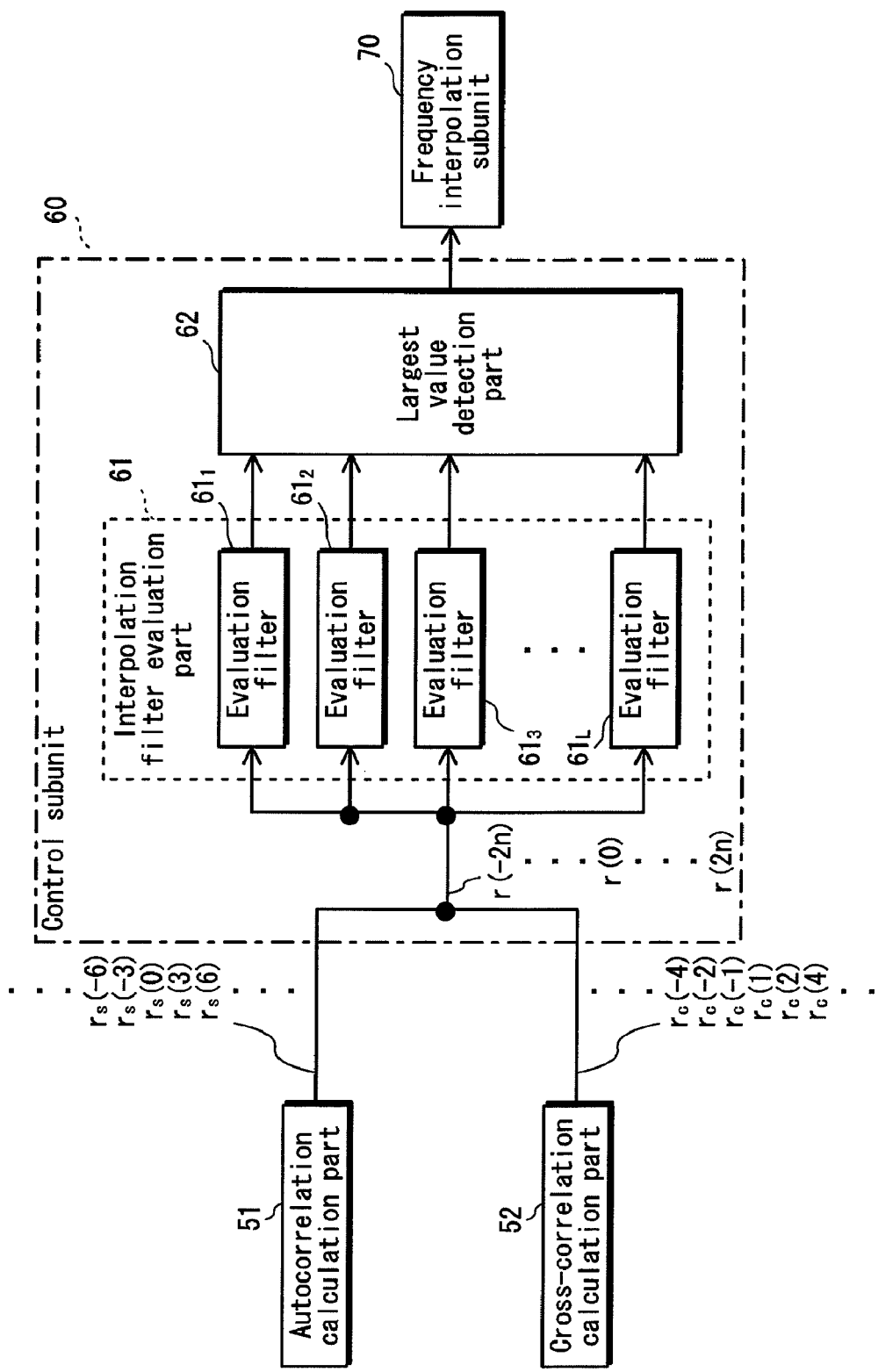
FIG. 7 is a structural diagram of a control subunit shown in FIG. 2.

With reference to FIG. 7, the following describes the structure and operations of the control subunit 60. FIG. 7 is a structural diagram of the control subunit 60 shown in FIG. 2. In FIG. 7, the autocorrelation calculation part 51, the cross-correlation calculation part 52 and the frequency interpolation subunit 70 are also illustrated to clearly convey how the internal elements of the control subunit 60 are connected thereto.

The control subunit 60 includes an interpolation filter evaluation part 61 and a largest value detection part 62. The interpolation filter evaluation part 61 includes L evaluation filters 61$_1$ to 61$_L$ (L is an integer equal to or larger than two). Note, the larger the number of evaluation filters in the interpolation filter evaluation part 61 is, the more detailed control the values of tap coefficients of the interpolation filter 71 are subjected to, and the larger the scale of the circuit becomes. The number of evaluation filters should be determined with the above-noted factors taken into consideration.

Each of the evaluation filters 61$_1$ to 61$_L$ estimates the average power of the output signal from the interpolation filter 71 when the interpolation filter 71 is controlled according to the corresponding transfer function.

Figure 8:
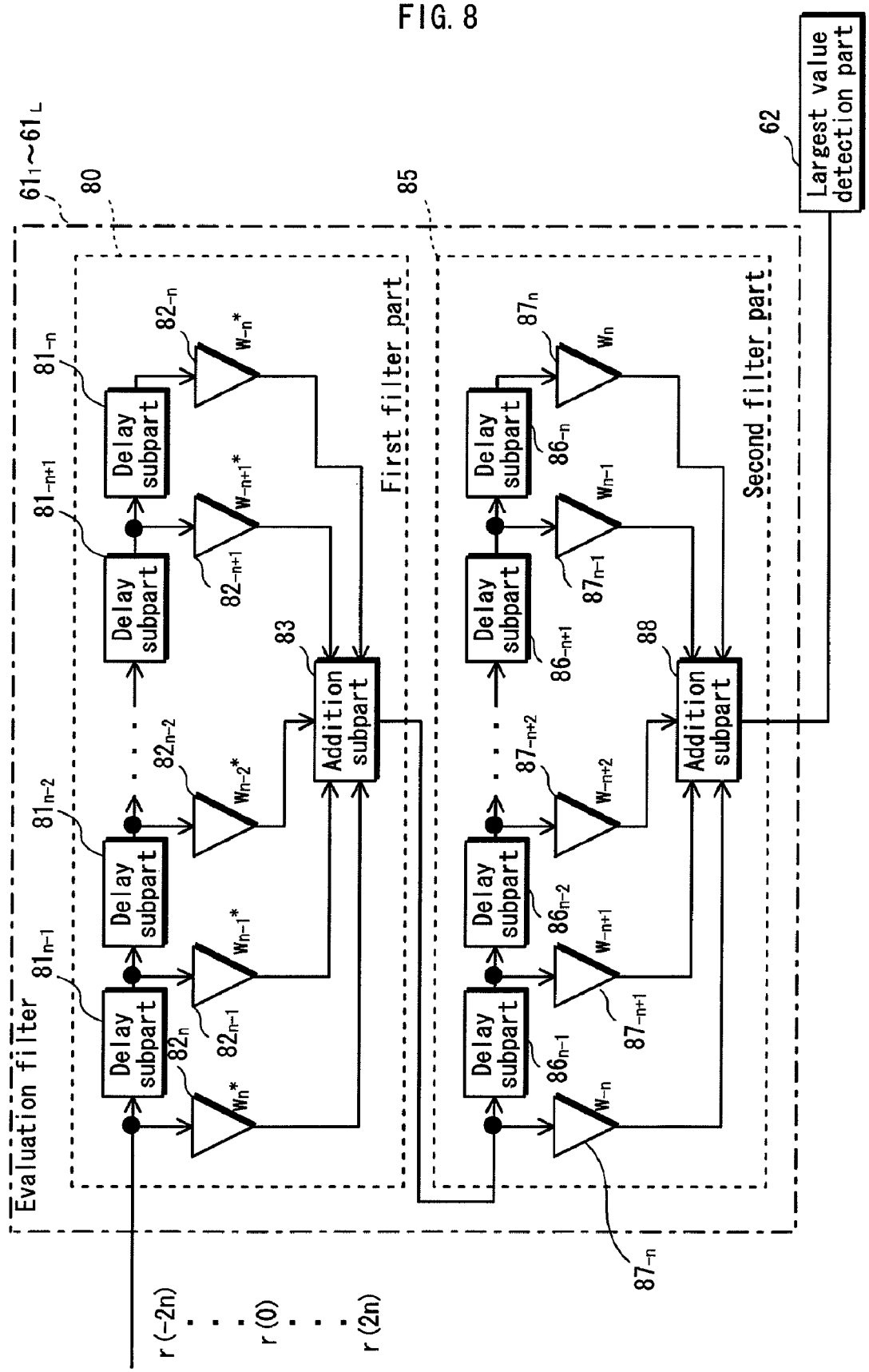
FIG. 8 is a structural diagram of each of evaluation filters shown in FIG. 7.

With reference to FIG. 8, the following describes the structure and operations of the evaluation filters 61$_1$ to 61$_L$. FIG. 8 is a structural diagram of the evaluation filters 61$_1$ to 61$_L$ shown in FIG. 7. In FIG. 8, the largest value detection part 62 is also illustrated to clearly convey how the internal elements of the evaluation filters 61$_1$ to 61$_L$ are connected thereto.

Each of the evaluation filters 61$_1$ to 61$_L$ includes a first filter part 80 and a second filter part 85. An output signal from the autocorrelation calculation part 51 and an output signal from the cross-correlation calculation part 52 are regarded as one correlation value string. Correlation value strings, namely correlation values r(−2n) to r(2n), are input to each of the evaluation filters 61$_1$ to 61$_L$ in order.

The first filter part 80 is a Finite Impulse Response (FIR) filter that has 2n+1 taps. The first filter part 80 includes 2n delay subparts 81$_{n-1}$ to 81$_{-n}$, 2n+1 multiplication subparts 82$_n$ to $82_{-n}$ and an addition subpart 83. Each of the delay subparts $81_{n-1}$ to $81_{-n}$ delays an input value and outputs the delayed input value. Each of the multiplication subparts $82_n$ to $82_{-n}$ multiplies an input value by a corresponding one of values of tap coefficients $w_n^*$ to $w_{-n}^*$, and outputs a value obtained by this multiplication. To further expound, a multiplication subpart $82_i$ (i is an integer satisfying the relationship $-n \leq i \leq n$) multiplies an input value by a tap coefficient $w_i^*$, and outputs a value obtained by this multiplication. The addition subpart 83 sums values output from the multiplication subparts $82_n$ to $82_{-n}$ and outputs a value obtained by this sum.

The second filter part 85 is an FIR filter that has 2n+1 taps. The second filter part 85 includes 2n delay subparts $86_{n-1}$ to $86_{-n}$, 2n+1 multiplication subparts $87_{-n}$ to $87_n$, and an addition subpart 88. Each of the delay subparts $86_{n-1}$ to $86_{-n}$ delays an input value and outputs the delayed input value. Each of the multiplication subparts $87_{-n}$ to $87_n$ multiplies an input value by a corresponding one of values of tap coefficients $w_{-n}$ to $w_n$, and outputs a value obtained by this multiplication. To further expound, a multiplication subpart $87_i$ (i is an integer satisfying the relationship $-n \leq i \leq n$) multiplies an input value by a tap coefficient $w_i$, and outputs a value obtained by this multiplication. The addition subpart 88 sums values output from the multiplication subparts $87_{-n}$ to $87_n$, and outputs a value obtained by this sum to the largest value detection part 62.

Note, tap coefficients of each of the evaluation filters $61_1$ to $61_L$ (i.e., $w_n^*$ to $w_{-n}^*$ and $w_{-n}$ to $w_n$) are set such that the second filter parts 85, which are respectively included in the evaluation filters $61_1$ to $61_L$, have different transfer functions from one another.

As shown in FIG. 8, the tap coefficients of the first filter part 80 are complex conjugates of the tap coefficients of the second filter part 85 arranged in reverse order. Also, the second filter part 85 included in each of the evaluation filters $61_1$ to $61_L$ corresponds to the interpolation filter 71.

Once the evaluation filters $61_1$ to $61_L$ have operated after the correlation value r(2n) is input thereto, the largest value detection part 62 observes values output from the addition subparts 88. The largest value detection part 62 detects, from among all of the values output from the evaluation filters $61_1$ to $61_L$, the largest output value. Then, the largest value detection part 62 controls the values of the tap coefficients $w_{-n}$ to $w_n$ of the interpolation filter 71 in accordance with the values of the tap coefficients $w_{-n}$ to $w_n$ of the second filter part 85 included in the evaluation filter that has output the detected largest output value.

The frequency interpolation subunit 70 includes the interpolation filter 71 (described later). The values of tap coefficients of the interpolation filter 71 are controlled by the control subunit 60. Using the controlled tap coefficients, the interpolation filter 71 interpolates, in the frequency direction, estimated channel characteristics values input from the time interpolation part 32 (see FIG. 17(c)), and outputs the results of this interpolation to the equalization unit 17.

Figure 9:
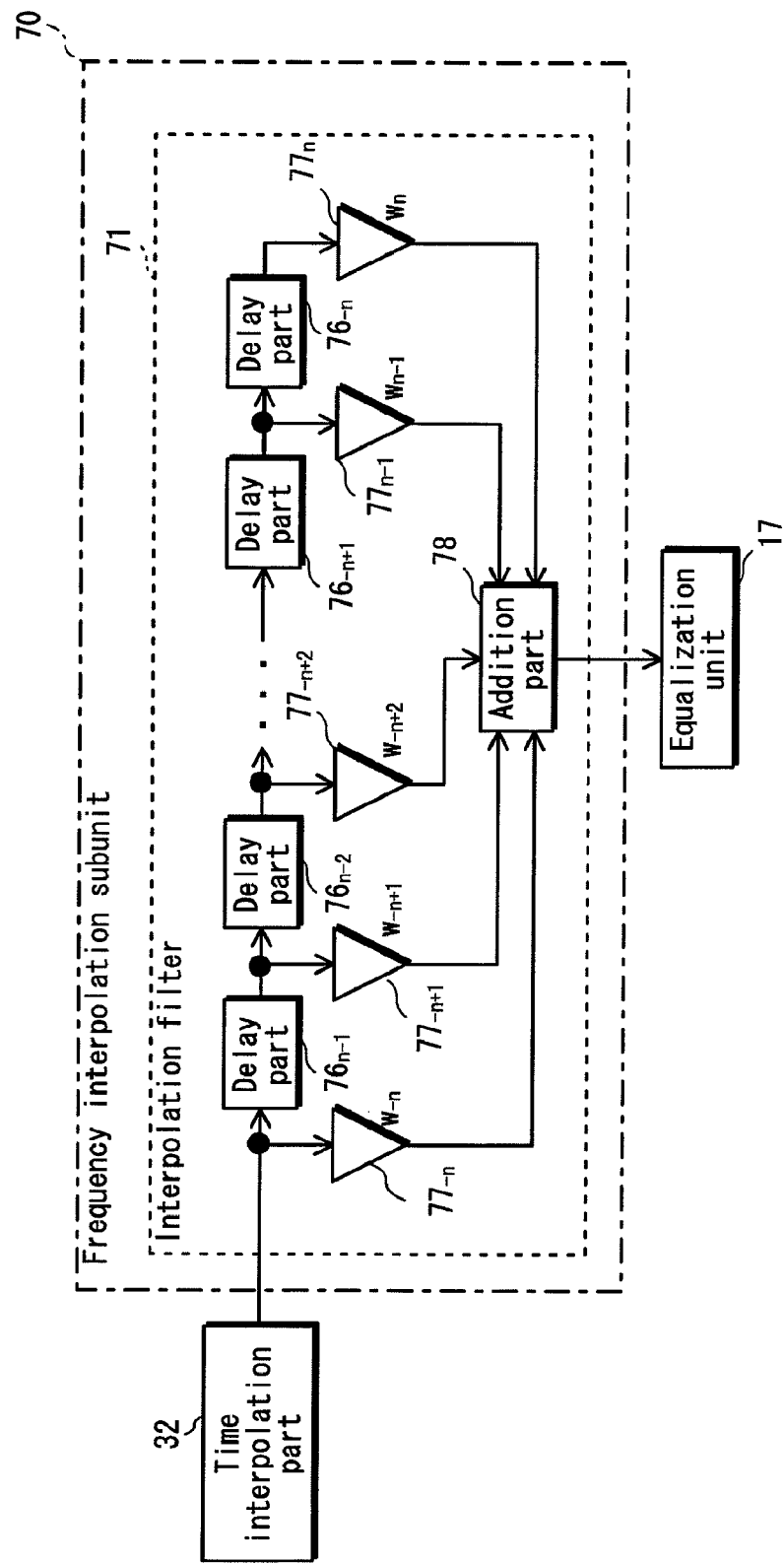
FIG. 9 is a structural diagram of a frequency interpolation subunit shown in FIG. 2.

Described below, with reference to FIG. 9, are the structure and operations of the frequency interpolation subunit 70. FIG. 9 is a structural diagram of the frequency interpolation subunit 70 shown in FIG. 2. In FIG. 9, the time interpolation part 32 and the equalization unit 17 are also illustrated to clearly convey how the internal elements of the frequency interpolation subunit 70 are connected thereto.

The interpolation filter 71 included in the frequency interpolation subunit 70 is an FIR filter that has 2n+1 taps. The interpolation filter 71 includes 2n delay parts $76_{n-1}$ to $76_{-n}$, 2n+1 multiplication parts $77_{-n}$ to $77_n$, and an addition part 78.

The interpolation filter 71 is structured the same as each of the second filter parts 85 that are respectively included in the evaluation filters $61_1$ to $61_L$.

Each of the delay parts $76_{n-1}$ to $76_{-n}$ delays an input value and outputs the delayed input value. Each of the multiplication parts $77_{-n}$ to $77_n$ multiplies an input value by a corresponding one of values of the tap coefficients $w_{-n}$ to $w_n$, which are controlled by the largest value detection part 62 included in the control subunit 60, and outputs a value obtained by this multiplication. To further expound, a multiplication part $77_i$ (i is an interfere satisfying the relationship $-n \leq i \leq n$) multiplies an input value by a tap coefficient $w_i$ and outputs a value obtained by this multiplication. The addition part 78 sums values output from the multiplication parts $77_{-n}$ to $77_n$ and outputs a value obtained by this sum to the equalization unit 17 as a corresponding one of estimated channel characteristics values. This way, an estimated channel characteristics value is obtained for every cell in each carrier and each symbol.

Note, the largest value detection part 62 included in the control subunit 60 sets the tap coefficients $w_{-n}$ to $w_n$ of the interpolation filter 71, so that each of these tap coefficients $w_{-n}$ to $w_n$ has the same value as a corresponding one of the tap coefficients $w_{-n}$ to $w_n$ of the second filter part 85 that (i) is included in one of the evaluation filters $61_1$ to $61_L$, and (ii) has output the largest value (a tap coefficient $w_i$ of the second filter part 85=a corresponding tap coefficient $w_i$ of the interpolation filter 71, where i is an integer satisfying the relationship $-n \leq i \leq n$).

The following summarizes the above-described operations of the receiver 1. The tuner 12 tunes to a desired OFDM signal from among a plurality of OFDM signals received by the antenna 11. After the A/D converter 13 and the converter 14 have performed the above-described processing on the desired OFDM signal, the processed OFDM signal is input to the Fourier transform unit 15. The Fourier transform unit 15 transforms the processed OFDM signal, which is a time domain OFDM signal, into a frequency domain OFDM signal.

In the first channel estimation subunit 30 of the channel estimation unit 16, the pilot estimation part 31 estimates channel characteristics at the SP signal positions, and the time interpolation part 32 interpolates the estimated channel characteristics values in the time direction. The second channel estimation subunit 40 estimates channel characteristics at the TMCC signal positions. In the correlation calculation subunit 50, the autocorrelation calculation part 51 performs an autocorrelation calculation by using an output from the time interpolation part 32, and the cross-correlation calculation part 52 performs a cross-correlation calculation by using an output from the time interpolation part 32 and an output from the second channel estimation subunit 40.

The correlation value strings r(−2n) to r(2n), each of which is an autocorrelation value and a cross-correlation value, are input to each of the evaluation filters $61_1$ to $61_L$ included in the control subunit 60. The largest value detection part 62 observes values that are output from the evaluation filters $61_1$ to $61_L$ after the correlation value r(2n) is input thereto. Then, the largest value detection part 62 sets the tap coefficients $w_{-n}$ to $w_n$ of the interpolation filter 71 included in the frequency interpolation subunit 70, so that each of these tap coefficients $w_{-n}$ to $w_n$ has the same value as a corresponding one of the tap coefficients $w_{-n}$ to $w_n$ of the second filter part 85 that (i) is included in one of the evaluation filters $61_1$ to $61_L$ and (ii) has output the largest value. Once the largest value detection part 62 has set values of the tap coefficients $w_{-n}$ to $w_n$ of the interpolation filter 71, the interpolation filter 71 interpolates, in the frequency direction, the estimated channel characteristics values output from the time interpolation part 32, and outputs the results of this interpolation.

The equalization unit 17 divides the OFDM signal input from the Fourier transform unit 15 by the estimated channel characteristics values output from the frequency interpolation subunit 70. The error correction unit 18, the decode unit 19 and the display unit 20 perform the above-described processing on the signal output from the equalization unit 17.

<Principles>

The following explains the principles of the operations performed by the receiver 1 pertaining to the present embodiment. Note that in First and Second Embodiments, a character included in the parentheses that follow "w" in the <Principles> sections corresponds to a subscripted character that follows "w" in the <Structure and Operations . . . > sections. In Third Embodiment, "$w_0$" in the <Principles> section corresponds to "w" in the <Structure and Operations . . . > section, and a character included in the parentheses that follow "$w_0$" in the <Principles> section corresponds to a subscripted character that follows "w" in the <Structure and Operations . . . > section.

A vector of the tap coefficients of the interpolation filter 71 included in the frequency interpolation subunit 70 is defined by the following Equation 3. Note, in the <Principle> section of First Embodiment, the interpolation filter 71 is referred to as a "frequency interpolation filter". Hereinafter, this vector is referred to as a "coefficient vector". Also note, it is assumed that the frequency interpolation filter has 2n+1 taps.

$$w=[w(-n),\ldots,w(0),\ldots,w(n)]^T \quad \text{Equation 3}$$

The superscripted symbol "$^T$" denotes a transpose matrix. This rule applies to the rest of this Description.

A vector h of estimated channel characteristics values that are used by the frequency interpolation filter is defined by the following Equation 4 with respect to a frequency index "x". Hereinafter, this vector is referred to as a "channel vector".

$$h=[h(x+n),\ldots,h(x),\ldots,h(x-n)]^T \quad \text{Equation 4}$$

Provided that a result of multiplying the channel vector h defined by Equation 4 by the coefficient vector w of the frequency interpolation filter defined by Equation 3 (namely, a signal output from the frequency interpolation filter) is y, this output signal y is expressed by the following Equation 5.

$$y=w^T h \quad \text{Equation 5}$$

Here, while using different coefficient vectors w as parameters, the best frequency interpolation filter can be determined by obtaining a coefficient vector w that maximizes the average of the power P associated with the output signal y which has passed through the frequency interpolation filter.

The average of the power P associated with the output signal y (the signal output from the frequency interpolation filter) can be calculated by (i) multiplying the output signal y by its complex conjugate signal y*, and (ii) obtaining an expected value, as shown in the following Equation 6.

$$P=E\{yy^*\}=E\{w^T hh^H w^*\}=w^T R w^* \quad \text{Equation 6}$$

Note, the superscripted symbol "$^H$" denotes a conjugate transpose matrix. This rule applies to the rest of this Description.

In Equation 6, "R" represents an autocorrelation matrix of estimated channel characteristics values. This autocorrelation matrix R can be defined by the following Equation 7.

$$R = E\{hh^H\} = \begin{bmatrix} r(0) & \ldots & r(n) & \ldots & r(2n) \\ \vdots & \ddots & \vdots & \ddots & \vdots \\ r(-n) & \ldots & r(0) & \ldots & r(n) \\ \vdots & \ddots & \vdots & \ddots & \vdots \\ r(-2n) & \ldots & r(-n) & \ldots & r(0) \end{bmatrix} \quad \text{Equation 7}$$

In Equation 7, the autocorrelation matrix R is a matrix constituted from (2n+1) rows and (2n+1) columns, and its element r(k) is defined by the following Equation 8.

$$r(k)=E\{h(x)h^*(x-k)\} \quad \text{Equation 8}$$

In view of the above, the following procedures make it possible to obtain the average of the power P associated with the output signal y that has passed through the frequency interpolation filter whose coefficient vector is w.

First, autocorrelation values of a channel vector h (i.e., a vector of estimated channel characteristics values) are calculated. When the frequency interpolation filter has 2n+1 taps, autocorrelation values r(-2n) to r(2n) are calculated. Next, the calculated autocorrelation values are arranged into the matrix R. Then, the average of the power P associated with the output signal y (the signal output from the frequency interpolation filter) can be obtained by calculating Equation 6, namely $P=w^T R w^*$.

That is to say, by using the autocorrelation matrix R of the estimated channel characteristics values and the coefficient vector w of the frequency interpolation filter, the interpolation filter evaluation part 61 evaluates, in accordance with Equation 6, the average of the power P associated with the signal that is output from the frequency interpolation filter after the estimated channel characteristics values have passed through the frequency interpolation filter. In the control subunit 60, the largest value detection part 62 detects, from among different coefficient vectors, a coefficient vector w that maximizes the power P associated with the signal output from the frequency interpolation filter, and accordingly controls the coefficient vector of the interpolation filter 71 included in the frequency interpolation subunit 70.

As described above, in a case where channel characteristics at SP signal positions are estimated by using SP signals and the estimated channel characteristics values at the SP signal positions are interpolated in the time direction, the estimated channel characteristics values output from the time interpolation part 32 are obtained only for cells in every 3rd carrier, with the result that autocorrelation values are obtained only for every 3rd carrier as well. In light of this problem, the present embodiment introduces the following characteristic structures. Channel characteristics at TMCC signal positions are estimated by using TMCC signals. Cross-correlation values are obtained by cross-correlating (i) the estimated channel characteristics values output from the time interpolation part 32 and (ii) the estimated channel characteristics values at the TMCC signal positions. This way, cross-correlation values can be complementarily obtained for the cells for which autocorrelation values could not be obtained.

An autocorrelation matrix R can be calculated independently of any coefficient vector w. Therefore, when calculating powers by using different coefficient vectors was parameters, it is not necessary to calculate an autocorrelation matrix R every time different transfer functions of the interpolation filter, which are candidates for the transfer function according to which the interpolation filter is controlled, are evaluated. Also, the only data pieces required to calculate the powers are the autocorrelation values r(-2n) to r(2n) (a part of which is substituted by cross-correlation values in the present embodiment), i.e., (4n+1) data pieces. This number (4n+1) is sufficiently smaller than the number of FFT points, N. For example, as opposed to N=8192, (4n+1) is roughly equal to or smaller than 100. This makes it possible to reduce the amount of calculations required to measure different powers P, which have passed through the interpolation filter, by using different coefficient vectors was parameters.

Furthermore, as the autocorrelation matrix R is a Toeplitz matrix, calculating $w^H R w$ may be regarded as performing convolution on the coefficient vector w of a certain interpolation filter. This calculation is made possible by, for instance, cascading the first filter part 80 and the second filter part 85 as shown in FIG. 8.

Second Embodiment

The following describes Second Embodiment of the present invention with reference to the accompanying drawings. The difference between First and Second Embodiments lies in a method of controlling tap coefficients of an interpolation filter which is utilized when performing interpolation in the frequency direction.

As a receiver of Second Embodiment differs from that of First Embodiment mainly in the structure and operations of the control subunit included in the channel estimation unit, the following description is given with a focus on the control subunit. Structural elements of Second Embodiment that are substantially the same as in First Embodiment are assigned the same reference numbers thereas. As these structural elements have been explained in First Embodiment, they are omitted from Second Embodiment.

<Structure and Operations of Control Subunit>

Figure 10:
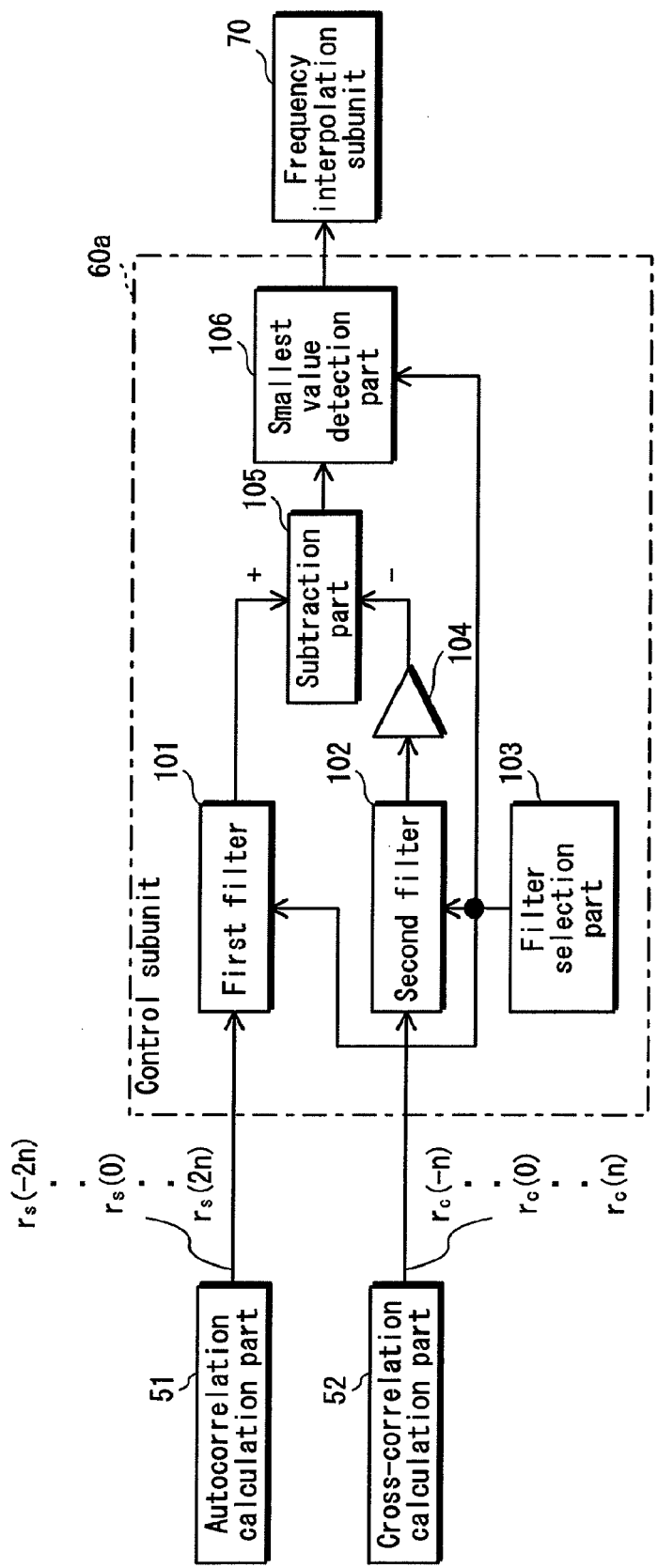
FIG. 10 is a structural diagram of a control subunit pertaining to Second Embodiment.

FIG. 10 is a structural diagram of a control subunit 60$a$ pertaining to the present embodiment. In FIG. 10, the correlation calculation part 51, the cross-correlation calculation part 52 and the frequency interpolation subunit 70 are also illustrated to clearly convey how the internal elements of the control subunit 60$a$ are connected thereto.

The control subunit 60$a$ includes a first filter 101, a second filter 102, a filter selection part 103, a multiplication part 104, a subtraction part 105, and a smallest value detection part 106.

The first filter 101 is structured the same as each of the evaluation filters 61$_1$ to 61$_L$ shown in FIG. 8. The values of tap coefficients of the first filter 101, namely $w_n^*$ to $w_{-n}^*$ and $w_{-n}$ to $w_n$, are set by the filter selection part 103. The autocorrelation calculation part 51 inputs, to the first filter 101, autocorrelation values $r_s(-2n)$ to $r_s(2n)$ in order. Upon receiving the autocorrelation value $r_s(2n)$, the first filter 101 outputs the result of filter operation to the subtraction part 105. As explained in First Embodiment, autocorrelation values are obtained only for every 3rd carrier; accordingly, a value "0" is input to the first filter 101 with respect to the cells for which autocorrelation values could not be obtained.

The second filter 102 is structured substantially the same as the interpolation filter 71 shown in FIG. 9. However, in addition, the second filter 102 also performs the functions of (i) extracting a real part from the output from the addition part 78 and (ii)) outputting the extracted real part to the multiplication part 104. The values of tap coefficients of the second filter 102, namely $w_{-n}$ to $w_n$, are set by the filter selection part 103. The cross-correlation calculation part 52 inputs, to the second filter 102, cross-correlation values $r_c(-n)$ to $r_c(n)$ in order. Upon receiving the cross-correlation value $r_c(n)$, the second filter 102 outputs, to the multiplication part 104, a real part that is obtained as a result of filter operation. Here, a value "0" is input to the second filter 102 with respect to the cells for which cross-correlation values could not be obtained.

The filter selection part 103 holds L sets of values, where each of the L sets of values (i) is a candidate for tap coefficients $w_{-n}$ to $w_n$ and (ii) gives different transfer functions to the first and second filters 101 and 102. The filter selection part 103 sets each of the L sets of values, in order, to the tap coefficients $w_n^*$ to $w_{-n}^*$ and $w_{-n}$ to $w_n$ of the first filter 101 and to the tap coefficients $w_{-n}$ to $w_n$ of the second filter 102. The filter selection part 103 also outputs, to the smallest value detection part 106, each of the L sets of values set to the tap coefficients $w_{-n}$ to $w_n$. Note, the larger the number of sets of values to be set to the tap coefficients $w_{-n}$ to $w_n$ is, the more detailed control the tap coefficients of the interpolation filter 71 included in the frequency interpolation subunit 70 are subjected to, and the larger the scale of calculation becomes. The number of sets of values to be set to the tap coefficients $w_{-n}$ to $w_n$ should be determined with the above-noted factors taken into consideration.

The multiplication part 104 multiplies a value output from the second filter 102 by a predetermined value, and outputs a value obtained by this multiplication to the subtraction part 105. The predetermined value is "2" in the present embodiment, in view of the fact that a coefficient of the second term of Equation 18 (described later) is "2".

The subtraction part 105 subtracts a value output from the multiplication part 104 from a value output from the first filter 101, and outputs a value obtained by this subtraction to the smallest value detection part 106.

The smallest value detection part 106 stores, in one-to-one association, (i) values output from the subtraction part 105 and (ii) the L sets of values set to the tap coefficients $w_{-n}$ to $w_n$, which are input from the filter selection part 103. By the time the smallest value detection part 106 has received and stored (i) all of the L sets of values set to the tap coefficients $w_{-n}$ to $w_n$, which are input from the filter selection part 103, in one-to-one association with (ii) all of the values output from the subtraction part 105 ("output values"), the smallest value detection part 106 detects, from among all of these output values, an output value having the smallest absolute value. Then, the values of the tap coefficients $w_{-n}$ to $w_n$ of the interpolation filter 71 included in the frequency interpolation subunit 70 are controlled in accordance with one of the L sets of values set to the tap coefficients $w_{-n}$ to $w_n$ which is associated with the detected output value having the smallest absolute value. More specifically, the tap coefficients $w_{-n}$ to $w_n$ of the interpolation filter 71 are set, so that each of these tap coefficients $w_{-n}$ to $w_n$ has the same value as a corresponding one of the tap coefficients $w_{-n}$ to $w_n$ that are associated with the output value having the smallest absolute value (a tap coefficient $w_i$ associated with the output value having the smallest absolute coefficient=a corresponding tap coefficient $w_i$ of the interpolation filter 71, where i is an integer satisfying the relationship $-n \leq i \leq n$).

The following summarizes the above-described operations of the control subunit 60$a$ and the frequency interpolation subunit 70.

The filter selection part 103 included in the control subunit 60$a$ sets the first set of values to the tap coefficients $w_n^*$ to $w_{-n}^*$ and $w_{-n}$ to $w_n$ of the first filter 101 and to the tap coefficients $w_{-n}$ to $w_n$ of the second filter 102. The filter selection part 103 then outputs the first set of values set to the tap coefficients $w_{-n}$ to $w_n$ to the smallest value detection part 106. The autocorrelation values $r_s(-2n)$ to $r_s(2n)$ are input to the first filter 101 in order. Upon receiving the autocorrelation value $r_s(2n)$, the first filter 101 outputs the result of filter operation to the subtraction part 105. Meanwhile, the cross-correlation values $r_c(-n)$ to $r_c(n)$ are input to the second filter 102 in order. Upon receiving the cross-correlation value $r_c(n)$, the second filter 102 outputs the result of filter operation to the multiplication part 104. The multiplication part 104 multiplies a value output from the second filter 102 by the predetermined value and outputs the result of this multiplication to the subtraction part 105. The subtraction part 105 subtracts a value output from the second filter 102 from a value output from the first filter 101, and outputs a value obtained by this subtraction to the smallest value detection part 106. The smallest value detection part 106 stores (i) a value output from the subtraction part 105 in association with (ii) the first set of values set to the tap coefficients $w_{-n}$ to $w_n$, which has been input from the filter selection part 103.

The control subunit 60a repeats the aforementioned processing by setting the second set of values, the third set of values, etc. to the tap coefficients $w_{-n}$ to $w_n$, until the last set of values is set to the tap coefficients $w_{-n}$ to $w_n$. The smallest value detection part 106 may, for example, utilize a counter and refer to the number counted thereby, so as to find out whether the counted number has reached the ordinal number of the last set of values set to the tap coefficients $w_{-n}$ to $w_n$. This way, the smallest value detection part 106 can judge whether it has stored, in association with each other, (i) the last set of values set to the tap coefficients $w_{-n}$ to $w_n$ and (ii) the value output from the subtraction part 105, after the last set of values have been set to the tap coefficients $w_{-n}$ to $w_n$.

The smallest value detection part 106 detects, from among all of the values output from the subtraction part 105 ("output values"), an output value that has the smallest absolute value. The smallest value detection part 106 then sets the tap coefficients $w_{-n}$ to $w_n$ of the interpolation filter 71 included in the frequency interpolation subunit 70, so that each of these tap coefficients $w_{-n}$ to $w_n$ has the same value as a corresponding one of the tap coefficients $w_{-n}$ to $w_n$ that are associated with the detected output value having the smallest absolute value. Once the smallest value detection part 106 has set values to the tap coefficients $w_{-n}$ to $w_r$, of the interpolation filter 71, the interpolation filter 71 interpolates, in the frequency direction, the estimated channel characteristics values output from the time interpolation part 32, and outputs the results of this interpolation.

<Principles>

The following explains the principles of the operations performed by the receiver pertaining to the present embodiment.

As evaluation indexes of the interpolation filter included in the frequency interpolation subunit 70, the following discusses errors between the estimated channel characteristics values that have passed through the interpolation filter and the estimated channel characteristics values that have been obtained by using the TMCC signals.

Assume that signal positions of M TMCC signals are $t_0$ to $t_{M-1}$. An estimated channel characteristics value $h_r(t_i)$ at a TMCC signal position $t_i$ is calculated by the second channel estimation subunit 40.

Meanwhile, a vector of tap coefficients of the interpolation filter included in the frequency interpolation subunit 70 is defined by Equation 3. The interpolation filter is referred to as a "frequency interpolation filter" in the <Principle> section of Second Embodiment. Hereinafter, this vector is referred to as a "coefficient vector". An estimated channel characteristics value $h_r'(t_i)$ at a TMCC signal position $t_i$ can be calculated in accordance with the following Equation 9, i.e., by multiplying the vector of estimated channel characteristics values $h_s$ output from the time interpolation part 32 (channel vector) by the coefficient vector w of the interpolation filter.

$$h'(t_i) = [w(-n), \ldots, w(0), \ldots, w(n)] \begin{bmatrix} h_s(t_i + n) \\ \vdots \\ h_s(t_i) \\ \vdots \\ h_s(t_i - n) \end{bmatrix} = w^T h_s(t_i) \quad \text{Equation 9}$$

Here, using different coefficient vectors was parameters, the best frequency interpolation filter can be determined by obtaining a coefficient vector w that minimizes the error between an estimated channel characteristics value $h_r(t_i)$ and an estimated channel characteristics value $h_r'(t_i)$.

An error $\delta(t_i)$ that arises at a TMCC signal position $t_i$ is expressed by the following Equation 10.

$$\delta(t_i) = h_t(t_i) - h'(t_i) = h_t(t_i) - w^T h_s(t_i) \quad \text{Equation 10}$$

The mean squared error $P_e$ at all of the TMCC signal positions can be obtained by using the following Equation 11.

$$P_e = E\{\delta(t_1)\delta^*(t_i)\} \quad \text{Equation 11}$$
$$= E\{h_t(t_i)h_t^*(t_i)\} - 2Re[E\{h_t(t_i)h_s^H(t_i)w^*\}] +$$
$$E\{w^T h_s(t_i)h_s^H(t_i)w^*\}$$

A coefficient vector w that minimizes the mean squared error $P_e$ should be obtained.

Firstly, the calculation of the first term of Equation 11 is discussed below. The first term, $E\{h_t(t_i)h_t^*(t_i)\}$, represents the mean squared value of the signal output from the second channel estimation subunit 40, and has no relevance to any coefficient vector w. As this mean squared value is a constant value, the process of finding the best coefficient vector w is not affected even if the first term, $E\{h_t(t_i)h_t^*(t_i)\}$, is not taken into consideration. Note, the process of finding the best coefficient vector w may of course be performed by taking the first term, $E\{(t_i)h_t^*(t_i)\}$, into consideration.

Secondly, the calculation of the second term of Equation 11 is discussed below. The expected value calculation of the second term represents a cross-correlation matrix $R_c$ obtained by the cross-correlation calculation part 52, and is expressed by the following Equations 12 and 13.

$$R_c = E\{h_t(t_i)h_s^H(t_i)\} \quad \text{Equation 12}$$
$$= E\{h_t(t_i)[h_s^*(t_i + n), \ldots, h_s^*(t_i), \ldots, h_s^*(t_i - n)]\}$$
$$= [r_c(-n), \ldots, r_c(0), \ldots r_c(n)]$$

$$r_c(k) = E\{h_t(t_i)h_s^*(t_i - k)\} \quad \text{Equation 13}$$

The cross-correlation matrix $R_c$ can be calculated independently of any coefficient vector w. Therefore, the cross-correlation matrix $R_c$ can be calculated prior to calculations for finding the best coefficient vector w.

Lastly, the calculation of the third term of Equation 11 is discussed below. The expected value calculation of the third term is an autocorrelation matrix $R_s$ obtained by the autocorrelation calculation part 51, and is expressed by the following Equations 14 and 15.

$$R_s = E\{h_s(t_i)h_s^H(t_i)\} \qquad \text{Equation 14}$$

$$= \begin{bmatrix} r_s(-n,-n) & \cdots & r_s(0,-n) & \cdots & r_s(n,-n) \\ \vdots & \ddots & \vdots & \ddots & \vdots \\ r_s(-n,0) & \cdots & r_s(0,0) & \cdots & r_s(n,0) \\ \vdots & \ddots & \vdots & \ddots & \vdots \\ r_s(-n,n) & \cdots & r_s(0,n) & \cdots & r_s(n,n) \end{bmatrix}$$

$$r_s(p,q) = E\{h_s(t_i-p)h_s^*(t_i-q)\} \qquad \text{Equation 15}$$

The autocorrelation matrix $R_s$ can be calculated independently of any coefficient vector w. Therefore, the autocorrelation matrix $R_s$ can be calculated prior to the calculations for finding the best coefficient vector w.

Also, the autocorrelation matrix $R_s$ turns into a Toeplitz matrix shown in the following Equation 17 by, as shown in the following Equation 16, approximating the autocorrelation values of mutually diagonal elements of Equation 14. This makes it possible to reduce the amount of calculations for finding the best coefficient vector w.

$$r_s(p,q) \approx r(p-q) \qquad \text{Equation 16}$$

$$R_s \approx \begin{bmatrix} r(0) & \cdots & r(n) & \cdots & r(2n) \\ \vdots & \ddots & \vdots & \ddots & \vdots \\ r(-n) & \cdots & r(0) & \cdots & r(n) \\ \vdots & \ddots & \vdots & \ddots & \vdots \\ r(-2n) & \cdots & r(-n) & \cdots & r(0) \end{bmatrix} \qquad \text{Equation 17}$$

Using the cross-correlation matrix $R_c$ and the autocorrelation matrix $R_s$, the mean squared error $P_e$ can be expressed by the following Equation 18.

$$P_e = E\{h_t(t_i)h_t^*(t_i)\} - 2Re[R_c w^*] + w^T R_s w^* \qquad \text{Equation 18}$$

In view of the above, the best coefficient vector w of the interpolation filter, which minimizes the mean squared error $P_e$, can be obtained in the following procedures.

Firstly, the autocorrelation calculation part 51 obtains an autocorrelation matrix $R_s$ based on the estimated channel characteristics values $h_s$, which have been interpolated in the time direction and output from the time interpolation part 32. Here, with the approximation of Equation 16, the autocorrelation calculation part 51 obtains (4n+1) autocorrelation values, namely r(−2n) to r(2n). On the other hand, the cross-correlation calculation part 52 obtains a cross-correlation matrix $R_c$ based on (i) the estimated channel characteristics values $h_s$, which have been interpolated in the time direction and output from the time interpolation part 32, and (ii) the estimated channel characteristics values $h_t$ output from the second channel estimation subunit 40. Then, the control subunit 60a calculates the mean squared error $P_e$ by using different coefficient vectors was parameters, and determines a coefficient vector w that minimizes the mean squared error $P_e$.

The autocorrelation matrix $R_s$ and the cross-correlation matrix $R_c$ can be calculated independently of any coefficient vector w. Accordingly, in the process of calculating the mean squared error $P_e$ using different coefficient vectors was parameters, the autocorrelation matrix $R_s$ and the cross-correlation matrix $R_c$ may be calculated prior to calculations of finding the best coefficient vector w of the interpolation filter. Also, the only data pieces required to calculate the mean squared error $P_e$ are (i) the autocorrelation values r(−2n) to r(2n), i.e., (4n+1) data pieces, and (ii) the cross-correlation values $r_c$(−n) to $r_c$(n), i.e., (2n+1) data pieces. Each of these numbers, namely (4n+1)+(2n+1), is sufficiently smaller than the number of FFT points, N. For example, as opposed to N=8192, (4n+1) is roughly equal to or smaller than 100. This makes it possible to reduce the amount of calculations required to measure the mean squared error $P_e$ by using different coefficient vectors was parameters.

Third Embodiment

The following describes Third Embodiment of the present invention with reference to the accompanying drawings. The difference between First and Third Embodiments lies in a method of controlling tap coefficients of an interpolation filter which is utilized when performing interpolation in the frequency direction.

A receiver of Third Embodiment differs from the receivers of First and Second Embodiments mainly in the structures and operations of the correlation calculation subunit, the control subunit and the frequency interpolation subunit included in the channel estimation unit. The following description is thus given with focuses on the correlation calculation subunit, the control subunit and the frequency interpolation subunit. Structural elements of Third Embodiment that are substantially the same as in First and Second Embodiments are assigned the same reference numbers thereas. As these structural elements have been explained in First and Second Embodiments, they are omitted from Third Embodiment.

<Structure and Operations of Channel Estimation Unit>

Figure 11:
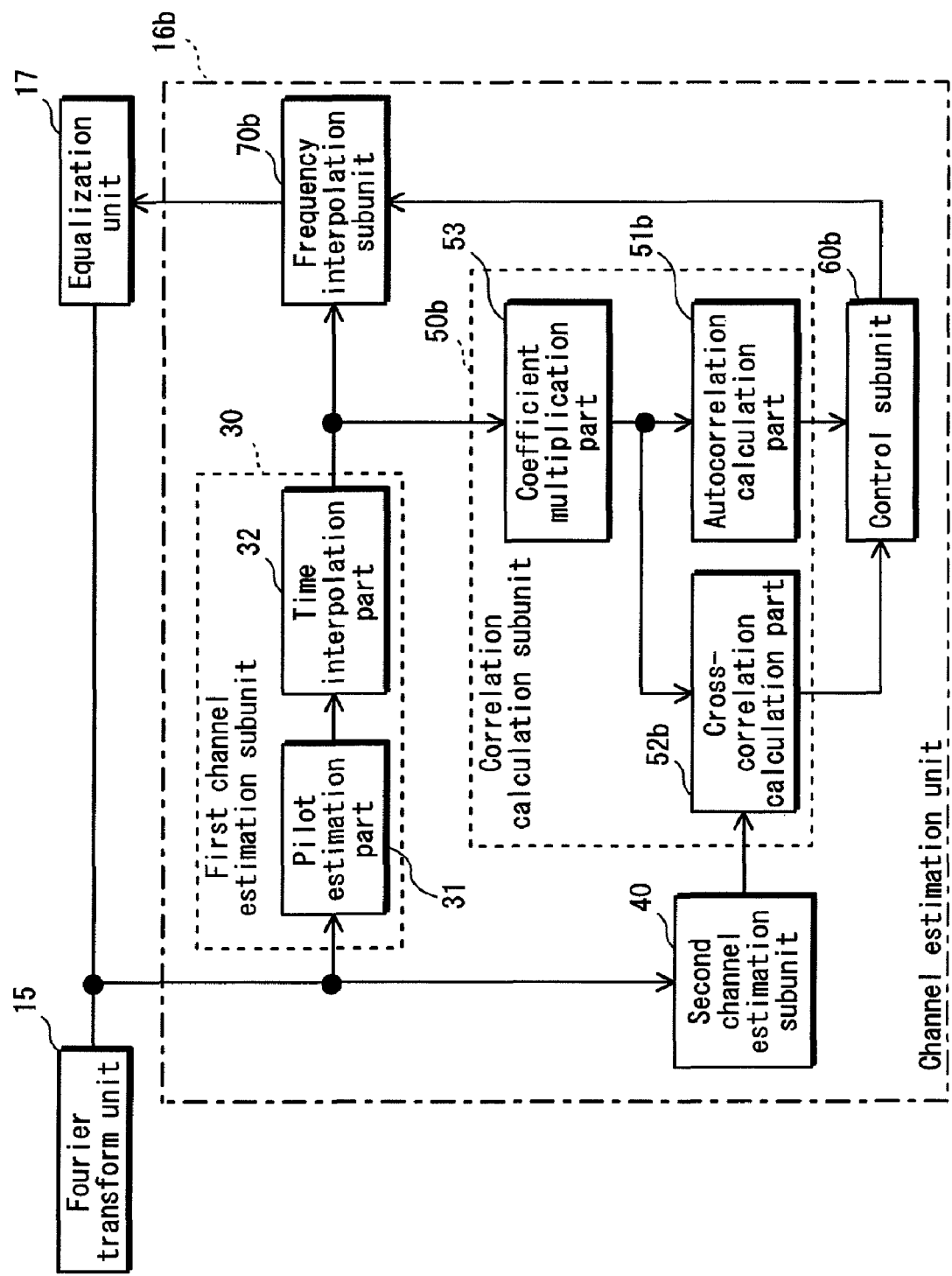
FIG. 11 is a structural diagram of a channel estimation unit pertaining to Third Embodiment.

FIG. 11 is a structural diagram of a channel estimation unit 16b pertaining to the present embodiment. In FIG. 11, the Fourier transform unit 15 and the equalization unit 17 are also illustrated to clearly convey how the internal elements of the channel estimation unit 16b are connected thereto.

The channel estimation unit 16b includes a first channel estimation subunit 30, a second channel estimation subunit 40, a correlation calculation subunit 50b, a control subunit 60b and a frequency interpolation subunit 70b.

The correlation calculation subunit 50b includes a coefficient multiplication part 53, an autocorrelation calculation part 51b and a cross-correlation calculation part 52b.

The coefficient multiplication part 53 multiplies the estimated channel characteristics values input from the time interpolation part 32 by values of predetermined coefficients $w_{−n}$ to $w_n$, and outputs the results of this multiplication to the autocorrelation calculation part 51b and the cross-correlation calculation part 52b. Here, the predetermined coefficients $w_{−n}$ to $w_n$ have the same values as coefficients $w_{−n}$ to $w_n$ by which multiplication parts $302_{−n}$ to $302_n$, which are included in an interpolation filter 71b (described later) of the frequency interpolation subunit 70b, multiply input values (a tap coefficient $w_i$=a corresponding tap coefficient $w_i$ of a multiplication part 302i included in the interpolation filter 71b, where i is an integer satisfying the relationship −n≦i≦n). Note, as stated in First Embodiment, the estimated channel characteristics values output from the time interpolation part 32 are obtained only for every 3rd carrier. Accordingly, a value "0" is input into the coefficient multiplication part 53 with respect to the cells for which estimated channel characteristics values could not be obtained.

Figure 12:
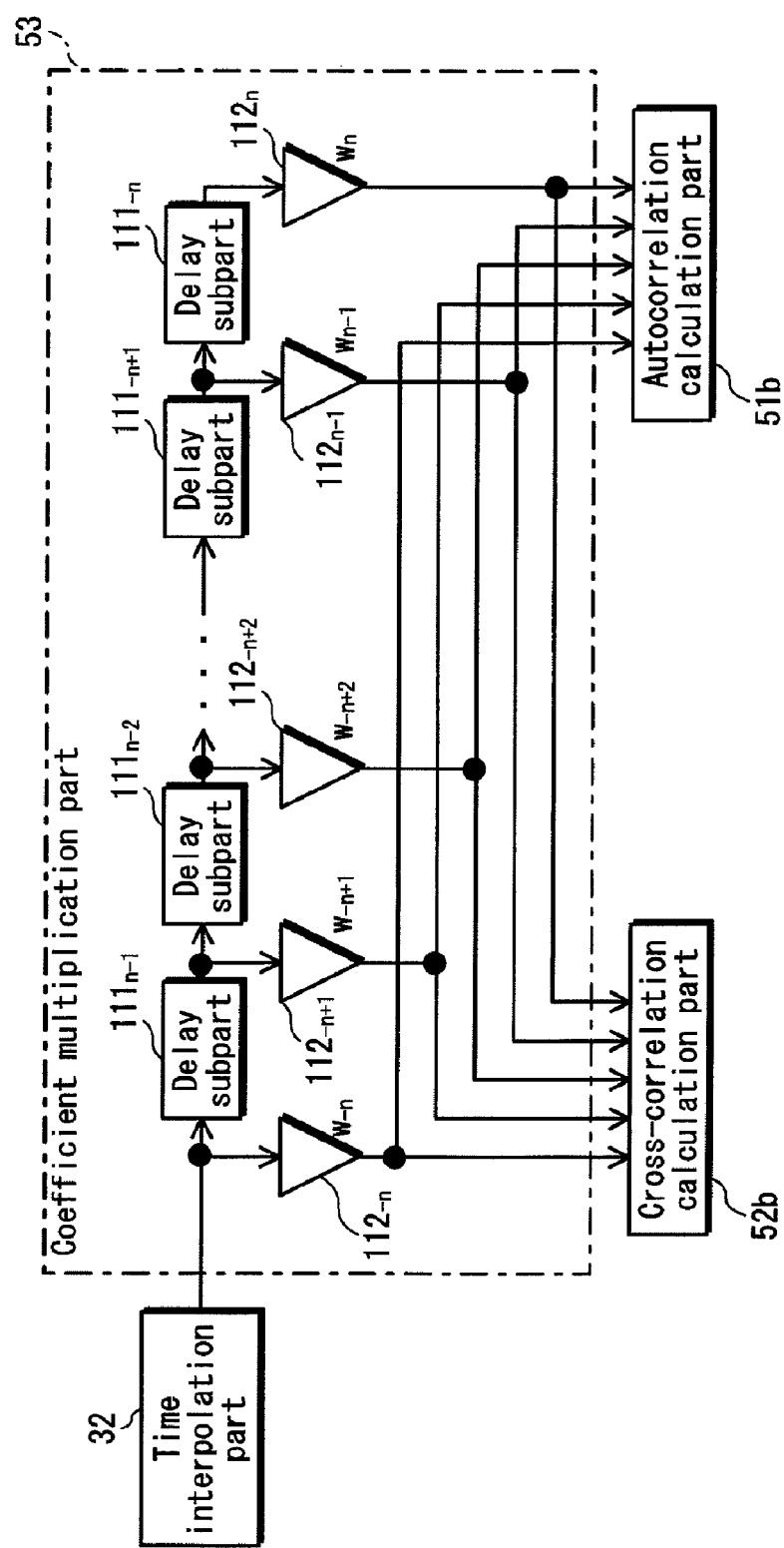
FIG. 12 is a structural diagram of a coefficient multiplication part shown in FIG. 11.

Described below, with reference to FIG. 12, are the structure and operations of the coefficient multiplication part 53. FIG. 12 is a structural diagram of the coefficient multiplication part 53 shown in FIG. 11. In FIG. 12, the time interpolation part 32, the autocorrelation calculation part 51b and the cross-correlation calculation part 52b are also illustrated to clearly convey how the internal elements of the coefficient multiplication part 53 are connected thereto.

The coefficient multiplication part 53 includes 2n delay subparts $111_{n-1}$ to $111_{-n}$ and 2n+1 multiplication subparts $112_{-n}$ to $112_n$. Each of the delay subparts $111_{n-1}$ to $111_{-n}$ delays an input value and outputs the delayed input value. Each of the multiplication subparts $112_{-n}$ to $112_n$ multiplies an input value by a corresponding one of values of tap coefficients $w_{-n}$ to $w_n$, and outputs a value obtained by this multiplication to the autocorrelation calculation part 51b and the cross-correlation calculation part 52b. To further expound, a multiplication subpart $112_i$ (i is an integer satisfying the relationship $-n \leq i \leq n$) multiplies an input value by a tap coefficient $w_i$, and outputs a value obtained by this multiplication.

Estimated channel characteristics values $h_s(-n)$ to $h_s(n)$ are input to the coefficient multiplication part 53 in order. The autocorrelation calculation part 51b performs autocorrelation calculations by using values that are output from the coefficient multiplication part 53 when the coefficient multiplication part 53 has operated after the estimated channel characteristics value $h_s(n)$ is input thereto. Consequently, the autocorrelation calculation part 51b obtains autocorrelation values $r_s''(-2n)$ to $r_s''(2n)$ (see Equations 25 and 28 that are described later) and outputs the autocorrelation values $r_s''(-2n)$ to $r_s''(2n)$ to the control subunit 60b. On the other hand, the cross-correlation calculation part 52b performs cross-correlation calculations by using (i) values that are output from the coefficient multiplication part 53 when the coefficient multiplication part 53 has operated after the estimated channel characteristics value $h_s(n)$ is input thereto, and (ii) the estimated channel characteristics values input from the second channel estimation subunit 40. Consequently, the cross-correlation calculation part 52b obtains cross-correlation values $r_c'(-n)$ to $r_c'(n)$ and outputs the cross-correlation values $r_c'(-n)$ to $r_c'(n)$ to the control subunit 60b. Here, however, only a part of the autocorrelation values $r_s''$ and a part of the cross-correlation values $r_s'$ can be obtained.

By using the autocorrelation values input from the autocorrelation calculation part 51b and the cross-correlation values input from the cross-correlation calculation part 52b, the control subunit 60b controls a rotational amount that determines the reference transfer function of the interpolation filter 71b, so that the interpolation frequency subunit 70b outputs the least errors.

Figure 13:
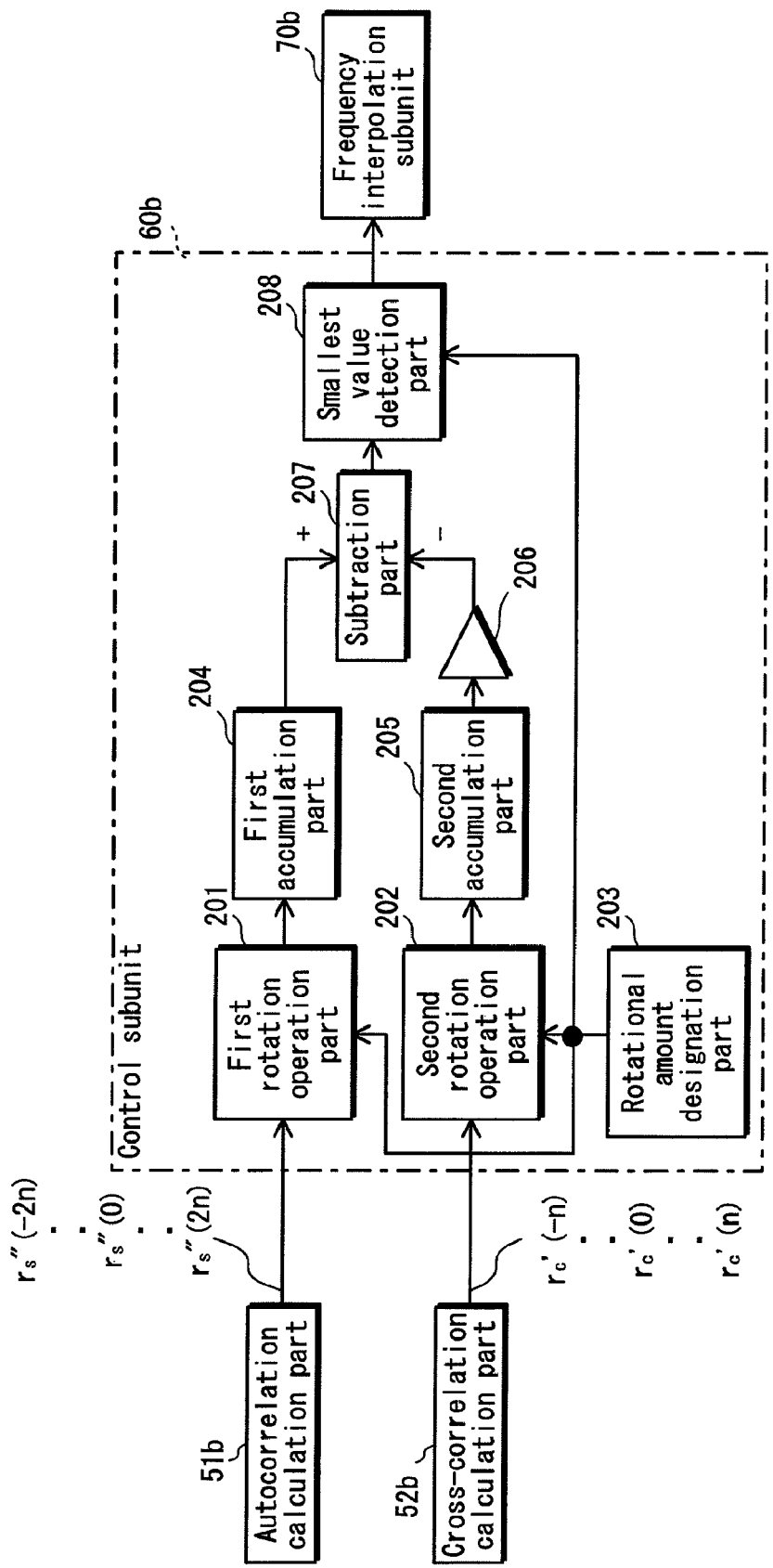
FIG. 13 is a structural diagram of a control subunit shown in FIG. 11.

Described blow, with reference to FIG. 13, are the structure and operations of the control subunit 60b. FIG. 13 is a structural diagram of the control subunit 60b shown in FIG. 12. In FIG. 13, the autocorrelation calculation part 51b, the cross-correlation calculation part 52b and the frequency interpolation subunit 70b are also illustrated to clearly convey how the internal elements of the control subunit 60b are connected thereto.

The control subunit 60b includes a first rotation operation part 201, a second rotation operation part 202, a rotational amount designation part 203, a first accumulation part 204, a second accumulation part 205, a multiplication part 206, a subtraction part 207, and a smallest value detection part 208.

The autocorrelation calculation part 51b inputs, to the first rotation operation part 201, the autocorrelation values $r_s''(-2n)$ to $r_s''(2n)$ in order. By using a rotational amount θ set by the rotational amount designation part 203, the first rotation operation part 201 calculates a signal y(x) by performing a rotation operation of the following Equation 19 on an autocorrelation value $r_s''(x)$ input from the autocorrelation calculation part 51b. The first rotation operation part 201 then outputs the calculated signal y(x) to the first accumulation part 204. Note that in Equation 19, an autocorrelation value $r_s''(x)$ is expressed as r(x), and N represents a sample number of the Fourier transform unit 15.

$$y = r(x) \cdot e^{-j\frac{2\pi \cdot x \cdot \theta}{N}} \qquad \text{Equation 19}$$

Figure 14:
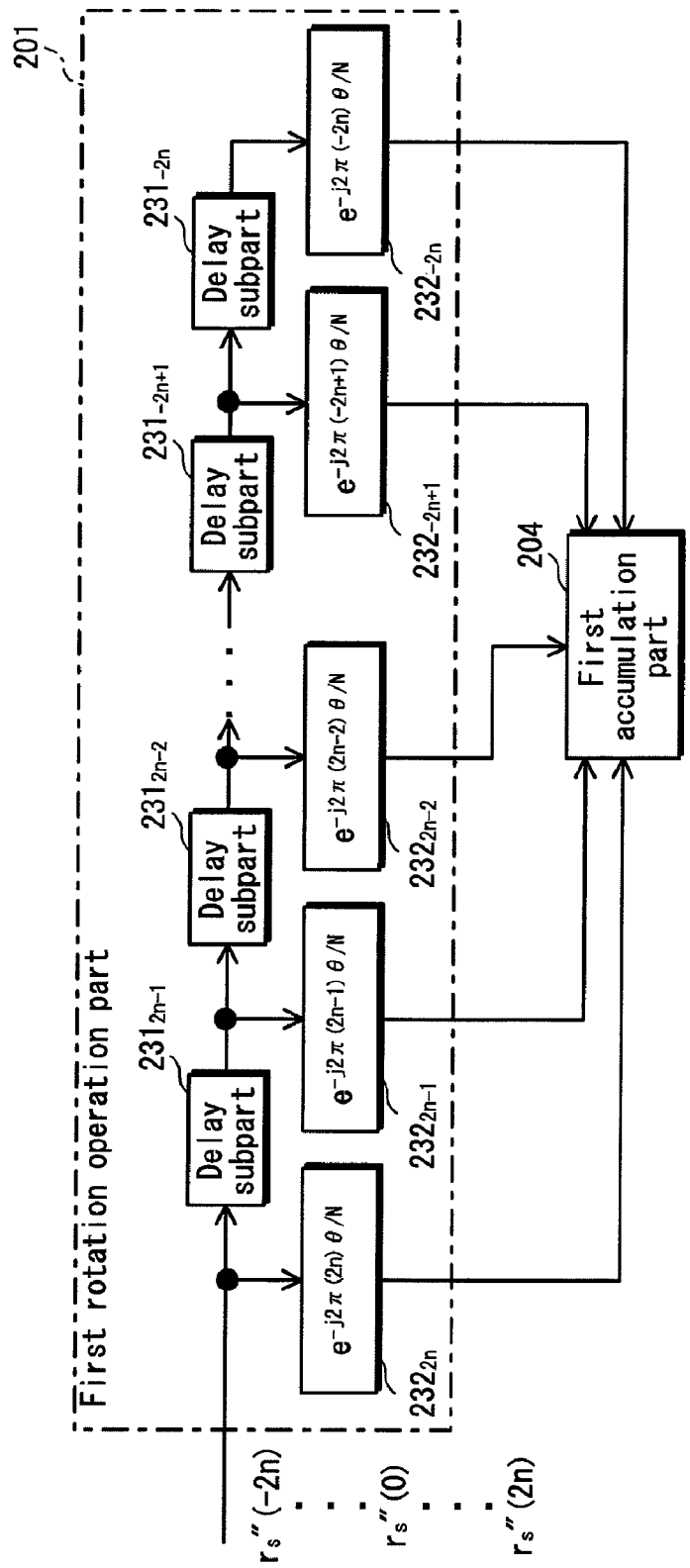
FIG. 14 is a structural diagram of a first rotation operation part shown in FIG. 13.

With reference to FIG. 14, the following describes the structure and operations of the first rotation operation part 201. FIG. 14 is a structural diagram of the first rotation operation part 201 shown in FIG. 13. In FIG. 14, the first accumulation part 204 is also illustrated to clearly convey how the internal elements of the first rotation operation part 201 are connected thereto.

The first rotation operation part 201 includes 4n delay subparts $231_{2n-1}$ to $231_{-2n}$, and 4n+1 phase rotation subparts $232_{2n}$ to $232_{-2n}$. The rotational amount designation part 203 sets a value of the rotational amount θ of each of the phase rotation subparts $232_{2n}$ to $232_{-2n}$. As stated earlier, the autocorrelation values $r_s''(-2n)$ to $r_s''(2n)$ are input to the first rotation operation part 201 in order.

Each of the delay subparts $231_{2n-1}$ to $231_{-2n}$ delays an input value and outputs the delayed input value. Each of the phase rotation subparts $232_{2n}$ to $232_{-2n}$ multiplies an input value by a corresponding one of $\exp\{-j2\pi(2n)\theta/N\}$ to $\exp\{-j2\pi(-2n)\theta/N\}$, and outputs the result of this multiplication to the first accumulation part 204. To further expound, a phase rotation subpart $232_i$ (i is an integer satisfying the relationship $-2n \leq i \leq 2n$) multiplies an input value by $\exp\{-j2\pi(i)\theta/N\}$ and outputs the result of this multiplication.

The cross-correlation calculation part 52b inputs, to the second rotation operation part 202, the cross-correlation values $r_c'(-n)$ to $r_c'(n)$ in order. By using a rotational amount θ set by the rotational amount designation part 203, the second rotation operation part 202 calculates a signal y(x) by performing the rotation operation of Equation 19 on a cross-correlation value $r_c'(x)$ input from the cross-correlation calculation part 52b. The second rotation operation part 202 then outputs the calculated signal y(x) to the second accumulation part 205. Note that in Equation 19, a cross-correlation value $r_c'(x)$ is expressed as r(x).

Figure 15:
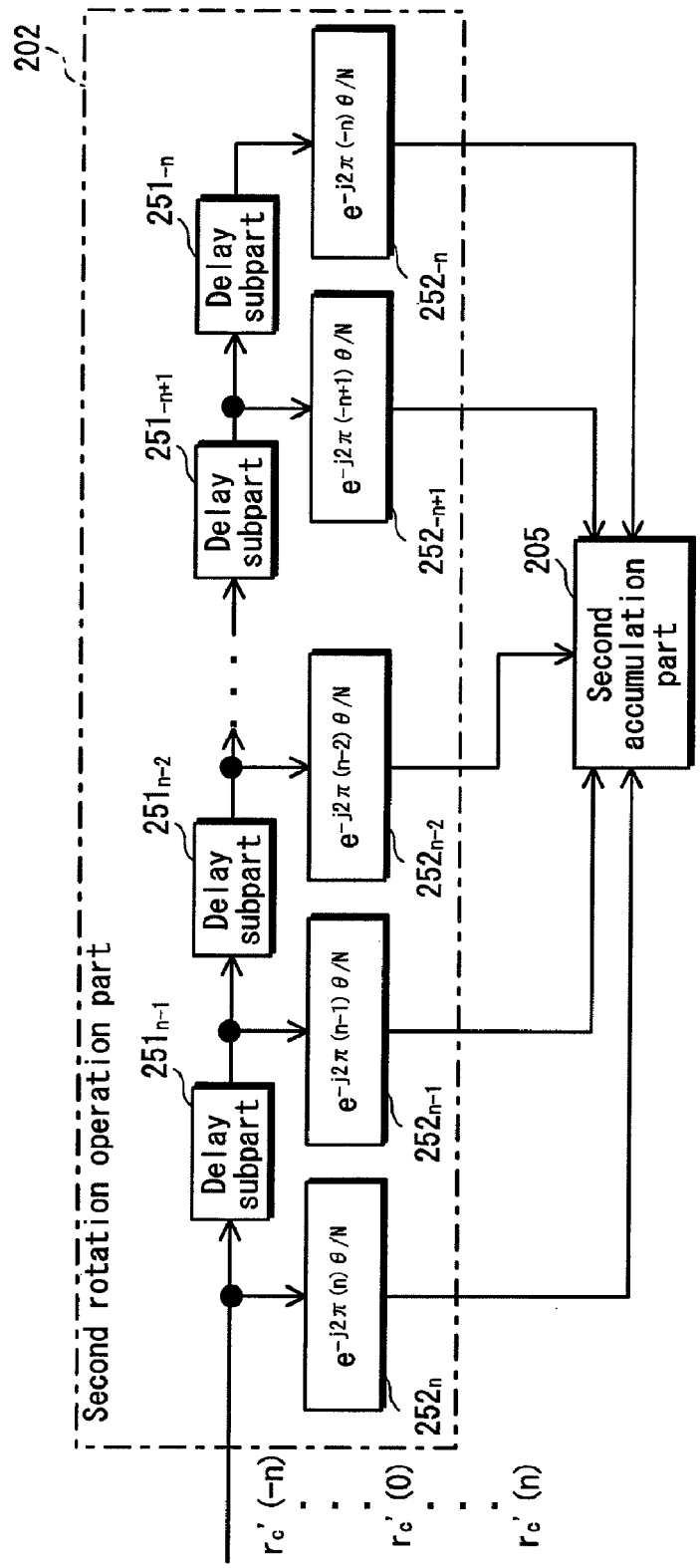
FIG. 15 is a structural diagram of a second rotation operation part shown in FIG. 13.

With reference to FIG. 15, the following describes the structure and operations of the second rotation operation part 202. FIG. 15 is a structural diagram of the second rotation operation part 202 shown in FIG. 13. In FIG. 15, the second accumulation part 205 is also illustrated to clearly convey how the internal elements of the second rotation operation part 201 are connected thereto.

The second rotation operation part 202 includes 2n delay subparts $251_{n-1}$ to $252_{-n}$, and 2n+1 phase rotation subparts $252_n$ to $252_{-n}$. The rotational amount designation part 203 sets a value of the rotational amount θ of each of the phase rotation subparts $252_n$ to $252_{-n}$. As stated earlier, the cross-correlation values $r_c'(-n)$ to $r_c'(n)$ are input to the second rotation operation part 202 in order.

Each of the delay subparts $251_{n-1}$ to $252_{-n}$ delays an input value and outputs the delayed input value. Each of the phase rotation subparts $252_n$ to $252_{-n}$ multiplies an input value by a corresponding one of $\exp\{-j2\pi(n)\theta/N\}$ to $\exp\{-j2\pi(-n)\theta/N\}$, and outputs the result of this multiplication to the second accumulation part 205. To further expound, a phase rotation subpart $252_i$ (i is an integer satisfying the relationship $-n \leq i \leq n$) multiplies an input value by $\exp\{-j2\pi(i)\theta/N\}$ and outputs the result of the multiplication. Note that in the present embodiment, each of the phase rotation subparts $252_n$ to $252_{-n}$ also extracts a real part from the result of the rotation operation, and outputs the extracted real part to the second accumulation part 205.

The rotational amount designation part 203 holds L different values (hereinafter, "L candidate values") that are candidates for a rotational amount θ. The rotational amount designation part 203 sets each of the L candidate values, in order, as (i) the rotational amount θ of each of the phase rotation subparts $232_{2n}$ to $232_{-2n}$ included in the first rotation operation part 201 and (ii) the rotational amount θ of each of the phase rotation subparts $252_n$ to $252_{-2n}$ included in the second rotation operation part 202. Subsequently, the rotational amount designation part 203 outputs, to the smallest value detection part 208, the L candidate values each of which has been set as the rotational amount θ. Note, the larger the number of candidate values to be set as a rotational amount θ is, the more detailed control the central position of the transfer function of the interpolation filter 71b included in the frequency interpolation subunit 70b is subjected to, and the larger the scale of calculation becomes. The number of candidate values to be set as a rotational amount θ should be determined with the above-noted factors taken into consideration.

The first accumulation part 204 accumulates values output from the first rotation operation part 201 (i.e., values output from the phase rotation subparts $232_{2n}$ to $232_{-2n}$), and outputs the accumulation result to the subtraction part 207.

The second accumulation part 205 accumulates values output from the second rotation operation part 202 (i.e., values output from the phase rotation subparts $252_n$ to $252_{-n}$), and outputs the accumulation result to the multiplication part 206.

The multiplication part 206 multiplies a value output from the second accumulation part 205 by a predetermined value, and outputs a value obtained by this multiplication to the subtraction part 207. The predetermined value is "2" in the present embodiment, in view of the fact that a coefficient of the second term of Equation 29 (described later) is "2".

The subtraction part 207 subtracts a value output from the multiplication part 206 from a value output from the first accumulation part 204, and outputs a value obtained by this subtraction to the smallest value detection part 208.

The smallest value detection part 208 stores, in one-to-one association, (i) the L candidate values, each of which has been set as the rotational amount θ and input from the rotational amount designation part 203, and (ii) values output from the subtraction part 207 ("output values"). By the time the smallest value detection part 208 has received and stored (i) all of the L candidate values in one-to-one association with (ii) the output values, the smallest value detection part 208 detects, from among all of these output values, an output value having the smallest absolute value. Then, the value of the rotational amount θ of the interpolation filter 71b included in the frequency interpolation subunit 70b is controlled in accordance with one of the L candidate values which is associated with the detected output value having the smallest absolute value. More specifically, the rotational amount θ of phase rotation parts $303_n$ to $303_{-n}$ (described later) included in the interpolation filter 71b is set so that it has the same value as the rotational amount θ that is associated with the detected output value having the smallest absolute value.

The frequency interpolation subunit 70b includes the interpolation filter 71b (described later). The value of the rotational amount of the interpolation filter 71b is controlled by the control subunit 60b. By using the controlled rotational amount, the frequency interpolation filter 71b interpolates, in the frequency direction, the estimated channel characteristics values input from the time interpolation part 32 (see FIG. 17(c)), and outputs the results of this interpolation to the equalization unit 17.

Figure 16:
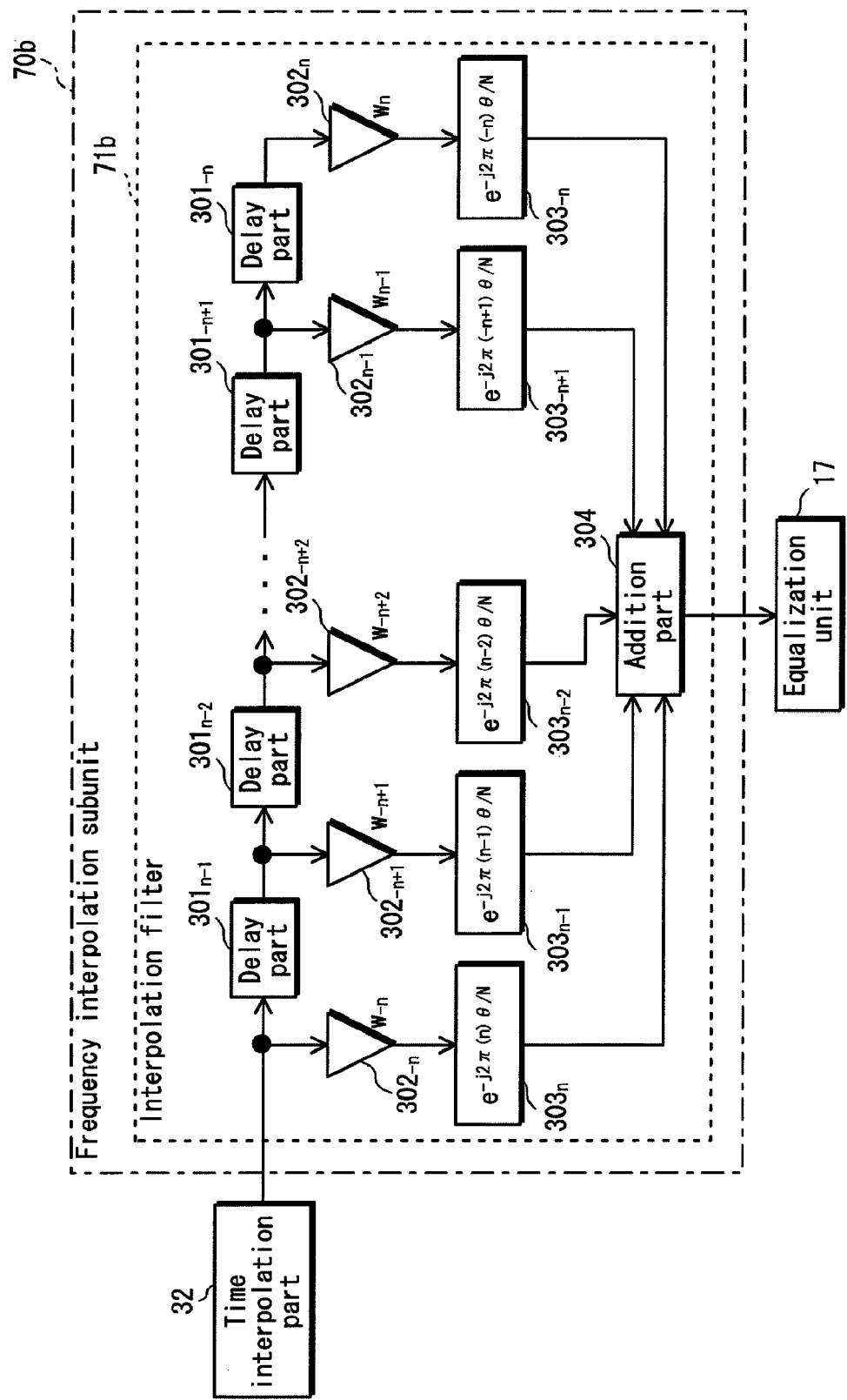
FIG. 16 is a structural diagram of a frequency interpolation subunit shown in FIG. 11.

Described below, with reference to FIG. 16, are the structure and operations of the frequency interpolation subunit 70b. FIG. 16 is a structural diagram of the frequency interpolation subunit 70b shown in FIG. 11. In FIG. 16, the time interpolation part 32 and the equalization unit 17 are also illustrated to clearly convey how the internal elements of the frequency interpolation subunit 70b are connected thereto.

The interpolation filter 71b included in the frequency interpolation subunit 70b is an FIR filter having 2n+1 taps. The interpolation filter 71b includes 2n delay parts $303_{n-1}$ to $301_{-n}$, 2n+1 multiplication parts $302_{-n}$ to $302_n$, 2n+1 phase rotation parts $303_n$ to $303_{-n}$, and an addition part 304. The value of the rotational amount θ of the phase rotation parts $303_n$ to $303_{-n}$ is set by the rotational amount designation part 203.

Each of the delay parts $301_{n-1}$ to $301_{-n}$ delays an input value and outputs the delayed input value. Each of the multiplication parts $302_n$ to $302_n$ multiplies an input value by a value of a corresponding one of coefficients $w_{-n}$ to $w_n$, and outputs a value obtained by this multiplication. To further expound, a multiplication part $302_i$ (i is an integer satisfying the relationship −n≦i≦n) multiplies an input value by a coefficient $w_i$ and outputs a value obtained by this multiplication. Each of the phase rotation parts $303_n$ to $303_{-n}$ multiplies an input value by a corresponding one of $\exp\{-j2\pi(n)\theta/N\}$ to $\exp\{-j2\pi(-n)\theta/N\}$, and outputs a value obtained by this multiplication to the addition part 304. To further expound, a phase rotation part $303_i$ (i is an integer satisfying the relationship −n≦i≦n) multiplies an input value by $\exp\{-j2\pi(i)\theta/N\}$, and outputs a value obtained by this multiplication. The addition part 304 sums values output from the phase rotation parts $303_n$ to $303_{-n}$, and outputs the result of this sum to the equalization unit 17.

Provided that i is an integer satisfying the relationship −n≦i≦n, a tap coefficient is $w_{-i} \exp\{-j2\pi(i)\theta/N\}$, which is obtained by multiplying (i) a coefficient by which a multiplication part $302_{-i}$ multiplies an input value, by (ii) $\exp\{-j2\pi(i)\theta/N\}$, by which a phase rotation part $303_i$ multiplies an input value. Also, values of tap coefficients of the reference transfer function correspond to values of tap coefficients $w_{-n}$ to $w_n$ by which the multiplication parts $302_{-n}$ to $302_n$ respectively multiply input values.

The following summarizes the above-described operations of the channel estimation unit 16b.

In the first channel estimation subunit 30 of the channel estimation unit 16b, the pilot estimation part 31 estimates channel characteristics at SP signal positions, and the time interpolation part 32 performs interpolation in the time direction. The second channel estimation subunit 40 estimates channel characteristics at TMCC signal positions. In the correlation calculation subunit 50b, (i) the coefficient multiplication part 53 multiplies values output from the time interpolation part 32 by coefficients, (ii) the autocorrelation calculation part 51b performs autocorrelation calculations by using values output from the coefficient multiplication part 53, and (iii) the cross-correlation calculation part 52b performs cross-correlation calculations by using values output from the coefficient multiplication part 53 and values output from the second channel estimation subunit 40.

The rotational amount designation part 203 of the control subunit 60b sets, from among the L candidate values that are candidates for the rotational amount θ, the first candidate value as the rotational amount θ of the first rotation operation part 201 and as the rotational amount θ of the second rotation operation part 202. The rotational amount designation part 203 then outputs the first candidate value to the smallest value detection part 208. The autocorrelation values $r_s''(-2n)$ to $r_s''(2n)$ are input to the first rotation operation part 201 in order. The first rotation operation part 201 and the first accumulation part 204 perform the above-described processing. On the other hand, the cross-correlation values $r_c'(-n)$ to $r_c'(n)$ are input to the second rotation operation part 202 in order. The second rotation operation part 202, the second accumulation part 205 and the multiplication part 206 perform the above-described processing. The subtraction part 207 subtracts a value output from the multiplication part 206 from a value output from the first accumulation part 204, and outputs a value obtained by this subtraction to the smallest value detection part 208. The smallest value detection part 208 stores (i) the first candidate value, which has been set as the rotational amount θ and input from the rotation designation part 203, in association with (ii) the value output from the subtraction part 207.

In the control subunit 60b, the aforementioned processing is repeated by setting the second candidate value, the third candidate value, etc. of the L candidate values as the rotational amount θ in order, until the last candidate value is set as the rotational amount θ. The smallest value detection part 208 may, for example, utilize a counter and refer to the number counted thereby, so as to find out whether the counted number has reached the last candidate value set as the rotational amount θ. This way, the smallest value detection part 208 can judge whether it has stored, in one-to-one association, (i) all of the L candidate values, each of which has been set as the rotational amount θ and output from the rotational amount designation part 203, and (ii) all of the values output from the subtraction part 207.

The smallest value detection part 208 detects, from among the output values stored therein, an output value having the smallest absolute value. Then, the smallest value detection part 208 sets, as the rotational amount θ of the phase rotation parts $303_n$ to $303_{-n}$ of the interpolation filter 71b included in the frequency interpolation subunit 70b, one of the L candidate values which corresponds to the detected output value having the smallest absolute value. With such a candidate value set as the rotational amount θ by the smallest value detection part 208, the interpolation filter 71b interpolates, in the frequency direction, the estimated channel characteristics values output from the time interpolation part 32, and outputs the results of this interpolation.

<Principles>

The following explains the principles of the operations pertaining to the present embodiment.

As is the case with Second Embodiment, the following discusses, as evaluation indexes of the interpolation filter included in the frequency interpolation subunit 70b, errors between the estimated channel characteristics values that have passed through the interpolation filter and the estimated channel characteristics values that have been obtained by using TMCC signals. In this <Principles> section of Third Embodiment, the interpolation filter included in the frequency interpolation subunit 70b is referred to as a "frequency interpolation filter".

In the present embodiment, only the central position of the transfer function of the interpolation filter included in the frequency interpolation subunit 70b is controlled as a control parameter of the interpolation filter. Here, given that the central position is θ, a coefficient vector w can be expressed by the following Equation 20.

$$w = w_0 P_\theta$$ Equation 20

$$= \mathrm{diag}[w_0(-n), \ldots, w_0(0), \ldots, w_0(n)]$$

$$\left[ e^{-j\frac{2\pi n\theta}{N}}, \ldots e^{j\frac{0}{N}}, e^{j\frac{2\pi\theta}{N}}, \ldots, e^{j\frac{2\pi n\theta}{N}} \right]^T$$

In Equation 20, a matrix $w_0$ is a diagonal matrix that includes, as mutually diagonal elements, tap coefficients of the reference interpolation filter. $P_\theta$ is a rotation coefficient vector based on the central position θ of the interpolation filter.

By substituting Equation 20 into Equation 11, the mean squared error $P_e$ at all of the TMCC signal positions can be obtained using the following Equation 21.

$$P_e = E\{h_t(t_i)h_t^*(t_i)\} - 2Re[E\{h_t(t_i)h_s^H(t_i)w_0^*\}P_\theta^*] + P_\theta^T E\{w_0^T h_s(t_i)h_s^H(t_i)w_0^*\}P_\theta^*$$ Equation 21

In the present embodiment, the central position θ of the frequency interpolation filter that minimizes the mean squared error $P_e$ (shown in Equation 21) is calculated.

Firstly, the calculation of the first term of Equation 21 is discussed below. The first term, $E\{h_t(t_i)h_t^*(t_i)\}$, represents the mean squared value of a signal output from the second channel estimation subunit 40, and has no relevance to the central position θ. As this value is a constant value, the process of searching for the best central position θ of the frequency interpolation filter is not affected even if the first term is not taken into consideration. The process of searching for the best central position θ of the frequency interpolation filter may of course be performed by taking the first term, $E\{h_t(t_i)h_t^*(t_i)\}$, into consideration.

Secondly, the calculation of the second term of Equation 21 is discussed below. The expected value calculation of the second term is the cross-correlation matrix $R_c'$ obtained by the cross-correlation calculation part 52b, and is expressed by the following Equations 22 and 23.

$$R_c' = E\{h_t(t_i)h_s^H(t_i)w_0^*\} = [r_c'(-n), \ldots, r_c'(0), \ldots, r_c'(n)]$$ Equation 22

$$r_c'(k) = E\{h_t(t_i)h_s^*(t_i-k)w_0^*(k)\}$$ Equation 23

The cross-correlation matrix $R_c'$ can be calculated independently of the rotation coefficient vector $P_\theta$. Accordingly, the cross-correlation matrix $R_c'$ can be calculated prior to calculations for searching for the best central position θ of the frequency interpolation filter.

Lastly, the calculation of the third term of Equation 21 is discussed below. The expected value calculation of the third term is the autocorrelation matrix $R_s'$ obtained by the autocorrelation calculation part 51b, and is expressed by the following Equations 24 and 25.

$$R_s' = E\{w_0^T h_s(t_i)h_s^H(t_i)w_0^*\} =$$ Equation 24

$$\begin{bmatrix} r_s'(-n,-n) & \ldots & r_s'(0,-n) & \ldots & r_s'(n,-n) \\ \vdots & \ddots & \vdots & \ddots & \vdots \\ r_s'(-n,0) & \ldots & r_s'(0,0) & \ldots & r_s'(n,0) \\ \vdots & \ddots & \vdots & \ddots & \vdots \\ r_s'(-n,n) & \ldots & r_s'(0,n) & \ldots & r_s'(n,n) \end{bmatrix}$$

$$r_s'(p,q) = E\{w_0(p)h_s(t_i-p)w_0^*(q)h_s^*(t_i-q)\}$$ Equation 25

The autocorrelation matrix $R_s'$ can be calculated independently of the rotation coefficient vector $P_\theta$. Accordingly, the autocorrelation matrix $R_s'$ can be calculated prior to calculations for searching for the best central position θ of the frequency interpolation filter.

With the cross-correlation matrix $R_c'$ and the autocorrelation matrix $R_s'$, the mean squared error $P_e$ can be expressed by the following Equation 26.

$$P_e = E\{h_t(t_i)h_t^*(t_i)\} - 2Re[R_c' P_\theta^*] + P_\theta^T R_s' P_\theta^*$$ Equation 26

The following discusses the calculation of the third term of Equation 26, namely $P_\theta^T R_s' P_\theta^*$. The third term can be expressed by the following Equations 27 and 28.

$$P_\theta^T R_s' P_\theta^* = \begin{bmatrix} e^{-j\frac{2\pi n\theta}{N}}, \ldots, e^{j\frac{0}{N}}, \ldots, e^{j\frac{2\pi n\theta}{N}} \end{bmatrix}$$ Equation 27

$$\begin{bmatrix} r_s'(-n,-n) & \ldots & r_s'(0,-n) & \ldots & r_s'(n,-n) \\ \vdots & \ddots & \vdots & \ddots & \vdots \\ r_s'(-n,0) & \ldots & r_s'(0,0) & \ldots & r_s'(n,0) \\ \vdots & \ddots & \vdots & \ddots & \vdots \\ r_s'(-n,n) & \ldots & r_s'(0,n) & \ldots & r_s'(n,n) \end{bmatrix}$$

$$\begin{bmatrix} e^{j\frac{2\pi n\theta}{N}} \\ \vdots \\ e^{j\frac{0}{N}} \\ \vdots \\ e^{-j\frac{2\pi n\theta}{N}} \end{bmatrix}$$

$$= [r_s''(-2n), \ldots, r_s''(0), \ldots, r_s''(2n)]$$

$$\begin{bmatrix} e^{j\frac{2\pi 2n\theta}{N}}, \ldots, e^{j\frac{0}{N}}, \ldots, e^{-j\frac{2\pi 2n\theta}{N}} \end{bmatrix}^T$$

$$= R_s'' P_\theta''$$

$$r_s''(k) = \sum_{\substack{k=p-q \\ -n \le p \le n \\ -n \le q \le n}} r_s'(p,q)$$ Equation 28

Considering the fact that diagonal elements of the autocorrelation matrix $R_s'$ are multiplied, by the same rotation coefficient, the calculation of Equation 27 sums and consolidates each group of elements that are multiplied by the same rotation coefficient. The autocorrelation matrix $R_s''$ in Equation 27 can be calculated independently of the rotation coefficient vector $P_\theta$. Accordingly, the autocorrelation matrix $R_s'$ can be calculated prior to calculations for searching for the best central position $\theta$ of the frequency interpolation filter.

By using the cross-correlation matrix $R_c'$ and the autocorrelation matrix $R_s''$, the mean squared error $P_e$ can be expressed by the following Equation 29.

$$P_e = E\{h_t(t_i)h_t^*(t_i)\} - 2Re[R_c' P_\theta^*] + R_s'' P_\theta''$$ Equation 29

In view of the above, the best central position $\theta$ of the frequency interpolation filter, which minimizes the mean squared error $P_e$, can be obtained in the following procedures.

First, the autocorrelation calculation part 51*b* obtains the autocorrelation matrix $R_s''$ by multiplying the estimated channel characteristics values $h_s$, which have been output from the time interpolation part 32 after performing interpolation in the time direction, by the coefficient vector $w_0$. The cross-correlation calculation part 52*b* obtains the cross-correlation matrix $R_c'$ based on (i) the result of multiplying the estimated channel characteristics values $h_s$, which have been obtained after performing the interpolation in the time direction, by the coefficient vector $w_0$, and (ii) the estimated channel characteristics values $h_t$ output from the second channel estimation subunit 40. Thereafter, by using different central positions $\theta$ of the interpolation filter as parameters, the control subunit 60*b* calculates different rotation coefficient vectors $P_\theta$ and determines the central position $\theta$ of the interpolation filter that minimizes the mean squared error $P_e$.

The number of elements in the cross-correlation matrix $R_c'$ is 2n+1 (e.g., 47), and the number of elements in the autocorrelation matrix $R_s''$ is 4n+1 (e.g., 93). Each of these numbers is smaller than the number of FFT points (e.g., 8192). This makes it possible to reduce the scale of calculations for determining the coefficient vector w that minimizes the smallest mean squared error $P_e$ by using different central positions $\theta$ of the interpolation filter as parameters, as compared to the scale of processing for calculating errors by filtering the actual estimated channel characteristics values. The above procedures can also reduce the scale of calculations to a greater extent than Second Embodiment.

<<Additional Notes>>

The present invention is not limited to the above embodiments, and may be implemented in any forms as long as the aims of the present invention, as well as other relevant/accompanying aims, can be achieved. The following cases are also possible.

(1) The above embodiments have exemplarily described a digital television receiver compliant with the ISDB-T system. However, the present invention is not limited to this, and may instead be applied to digital television receivers compliant with, for example, the DVB-T system and the DVB-T2 system. The present invention may also be applied to a receiver other than a digital television receiver.

(2) In the above embodiments, a received signal has been described as an OFDM signal. However, the received signal is not limited to being an OFDM signal, but may instead be a transmission signal generated by multiplexing a plurality of modulated carriers that are not orthogonal to each other.

(3) In the above embodiments, each filter is an FIR filter. However, filters of the present invention are not limited to being FIR filters, but may instead be other types of filters such as Infinite Impulse Response (IIR) filters. Also, in the above embodiments, as each filter is an FIR filter, the transfer function of each filter is changed by using tap coefficients. The present invention, however, is not limited to this. The transfer function of each filter may be changed by using parameters that allow changing the transfer function of each filter.

(4) In the above First Embodiment, the interpolation filter evaluation part 61 has a plurality of evaluation filters. The present invention, however, is not limited to this. The interpolation filter evaluation part 61 may instead have one evaluation filter that is configured to evaluate different transfer functions of the interpolation filter 71 by changing tap coefficients thereof.

In the above Second Embodiment, the control subunit has one first filter and one second filter, and the rotational amount of to the first and second filters is changed. The present invention, however, is not limited to this. The control subunit may instead have a plurality of pairs of first and second filters that can evaluate different transfer functions of the interpolation filter 71.

Furthermore, in the above Third Embodiment, the control subunit has one first rotation operation part and one second rotation operation part, and the rotational amount of the first and second rotation operation parts is changed. The present invention, however, is not limited to this. The control subunit may instead have a plurality of pairs of first and second rotation operation parts that can evaluate different transfer functions of the central position of the interpolation filter 71*b*.

(5) In the above First Embodiment, the interpolation filter 71 is structured the same as each of the evaluation filters $61_1$ to $61_L$. The present invention, however, is not limited to this. There is no need to structure the interpolation filter 71 the same as each of the evaluation filters $61_1$ to $61_L$, as long as the tap coefficient of the interpolation filter 71 can be controlled such that the interpolation filter 71 has the same transfer function as an evaluation filter whose tap coefficients maximize the value output therefrom.

In the above Second Embodiment, the interpolation filter 71 is structured the same as the second filter 102. The present invention, however, is not limited to this. There is no need to structure the interpolation filter 71 the same as the second filter 102, as long as the tap coefficient of the interpolation filter 71 can be controlled such that the interpolation filter 71 has the same transfer function as the transfer function of the second filter whose tap coefficients minimizes the value output from the subtraction part 105.

Furthermore, in the above Third Embodiment, the first rotation operation part 201, the second rotation operation part 202 and the interpolation filter 71b are structured such that they all have the same rotational amount θ. However, the interpolation filter 71b is not limited to having the same rotational amount θ as the first and second rotation operation parts 201 and 202, as long as the rotational amount θ of the interpolation filter 71b can be controlled based on the rotational amount θ of the first and second rotational operation parts 201 and 202.

(6) In the above embodiments, based on decoded control information pieces included in one symbol, the TMCC decode part 42 identifies control information pieces carried through TMCC signals included in one symbol by making a majority decision with respect thereto. The present invention, however, is not limited to this. The following exemplary cases are also possible. The TMCC decode part 42 may (i) combine TMCC signals allocated to a plurality of carriers within one symbol, and (ii) decode the TMCC signals by using the combined TMCC signals. Alternatively, the TMCC decode part 42 may (i) select, from among a plurality of TMCC signals within one symbol, a TMCC signal having great reception quality, (ii) decode the TMCC signals by using the selected TMCC signal, and (iii) identify control information pieces transmitted through the TMCC signals. Alternatively, the TMCC decode part 42 may (i) decode a TMCC signal allocated to a predetermined carrier, and (ii) identify control information pieces carried through TMCC signals.

(7) In the above Third Embodiment, the transfer function of the interpolation filter 71b is controlled by using both of the autocorrelation values and the cross-correlation values. The present invention, however, is not limited to this. The transfer function of the interpolation filter 71b may be controlled by using the cross-correlation values only. For example, in a case where a filter having a filter coefficient of $w_0$ is a root Nyquist filter (i.e., in a case where the result of performing a convolution operation on a filter coefficient of $w_0$ is a Nyquist filter), only the autocorrelation value $r_s''(0)$ has a non-zero value whereas any other autocorrelation value $r_s''(k)$ (where $k \neq 0$) has a value of zero in Equation 28. Consequently, the third term of the right side of Equation 29 would become a constant. As this third term does not contribute to the process of searching for the smallest $P_e$, the calculation of the autocorrelation matrix $R_s''$ would be unnecessary as well. In this case, the transfer function of the interpolation filter 71b can be controlled by using the cross-correlation values only.

(8) In the above embodiments, the first channel estimation subunit 30 estimates channel characteristics by using SP signals, and the second channel estimation subunit 40 estimates channel characteristics by using TMCC signals. The present invention, however, is not limited to this. The channel characteristics can be estimated as long as the signals used by the first channel estimation subunit 30 to estimate channel characteristics are allocated differently from the signals used by the second channel estimation subunit 40 to estimate channel characteristics. For example, the following exemplary cases are possible. In the ISDB-T system, given that the first channel estimation subunit 30 uses SP signals to estimate channel characteristics, the second channel estimation subunit 40 may use one of the following (i) to (v) to estimate channel characteristics: (i) AC signals; (ii) TMCC signals and AC signals; (iii) TMCC signals and continual pilot signals (hereinafter, "CP signals"); (iv) AC signals and CP signals; and (v) TMCC signals, AC signals and CP signals. In the DVB-T system, given that the first channel estimation subunit 30 uses SP signals to estimate channel characteristics, the second channel estimation subunit 40 may use one of the following (i) to (iii) to estimate channel characteristics: (i) TPS signals; (ii) CP signals; and (iii) TPS signals and CP signals. Furthermore, in the DVB-T2 system, given that the first channel estimation subunit 30 uses SP signals to estimate channel characteristics, the second channel estimation subunit 40 may use CP signals to estimate channel characteristics.

As with TMCC signals, TPS signals are signals on which DBPSK has been performed by control information (e.g., a transmission parameter) in the symbol direction. In the TPS signals, a differential reference signal that has been modulated using a known phase is allocated to the first symbol of a frame. The TPS signals are allocated such that their positions are different from the SP signal positions and they are as least periodic as possible. TPS signals that are allocated to a plurality of carriers within one symbol have the same control information. Hence, the method of estimating channel characteristics by using TPS signals is substantially the same as the method of estimating channel characteristics by using TMCC signals.

AC signals are transmitted through a plurality of carriers, and are signals on which DBPSK has been performed in the symbol direction. In the AC signals, a differential reference signal that has been modulated using a known phase is allocated to the first symbol of a frame. As for an AC signal allocated to the first symbol of a frame, the amplitude and phase of that AC signal are known to the receiver, and thus channel characteristics can be estimated by using that AC signal. Modulation phases of AC signals allocated to symbols other than the first symbol of a frame are not known to the receiver. However, the receiver can obtain demodulated AC signals by performing demodulation processing that corresponds to DBPSK on AC signals. Thereafter, the receiver can obtain the modulation phases of such AC signals by performing DBPSK on the demodulated AC signals again by using the differential reference signal allocated to the first symbol of a frame. Then, channel characteristics at AC signal positions can be estimated by dividing AC signals included in the signal output from the Fourier transform unit 15 by the obtained signals.

Amplitudes, phases and positions of CP signals generated by the transmitter are known to the receiver. Thus, the second channel estimation subunit (i) extracts CP signals from the OFDM signal output from the Fourier transform unit 15, (ii) newly generates CP signals that are identical to CP signals inserted by the transmitter, (iii) divides each of the extracted CP signals by a corresponding one of the newly generated CP signals which has the same symbol and the same carrier, and (iv) considers each result of this division as an estimated channel characteristics value at the corresponding symbol and carrier (i.e., at the corresponding CP signal position).

(9) In the above embodiments, the transfer functions of the interpolation filters 71 and 71b included in the frequency interpolation subunits 70 and 70b are controlled by using estimated channel characteristics values output from the time interpolation part 32. The present invention, however, is not limited to this. The receiver of the present invention may not include the time interpolation part 32. In this case, the transfer functions of the interpolation filters 71 and 71b may be controlled by using estimated channel characteristics values obtained for every 12th carrier, which are output from the pilot estimation part 31.

(10) The above embodiments have discussed exemplary cases where the transfer functions of the interpolation filters 71 and 71b included in the frequency interpolation subunits 70 and 70b are controlled. The present invention, however, is not limited to this. In a case where the time interpolation part 32 performs the interpolation in the time direction by means of filter processing, the present invention may be applied to the control over the transfer function of an interpolation filter included in the time interpolation part 32.

(11) In the above embodiments, the following relationship is satisfied by both of the correlation values obtained as a result of autocorrelation calculations and the correlation values obtained as a result of cross-correlation calculations: $r(-x)=r(x)^*$. Thus, with respect to "x" that satisfies the relationship x>0, it is possible to further reduce the amount of calculations by performing (i) correlation calculations and (ii) calculation of $r(-x)=r(x)^*$.

(12) The receiver pertaining to each of the above embodiments is typically realized as LSI, which is an integrated circuit. A plurality of compositional units may each be manufactured integrated on one chip. Alternatively, a part or all of the compositional units may be manufactured integrated on one chip. Here, LSI may be IC, a system LSI, a super LSI or an ultra LSI, depending on the degree of integration. Furthermore, the integration of circuits is not limited to being realized with LSI, but may be realized with a special-purpose circuit or a general-use processor. Alternatively, the integration may be realized with use of a Field Programmable Gate Array (FPGA) that is programmable after manufacturing of the LSI, or a reconfigurable processor that enables reconfiguration of the connection and settings of circuit cells in the LSI. Furthermore, if technology for an integrated circuit that replaces LSIs appears due to advances in or derivations from semiconductor technology, that technology may be used for integration of the functional blocks. Bio-technology is one possible application.

(13) In a case where the procedures of the operations of the receiver explained in each of the above embodiments are written into a reception program, such procedures may be executed by CPU reading and executing the reception program stored in memory. Alternatively, the reception program may be recorded for distribution purposes.

The present invention is applicable to the control over the transfer function of an interpolation filter used to estimate channel characteristics.

REFERENCE SIGNS LIST 1 receiver
11 antenna
12 tuner
13 A/D converter
14 converter
15 Fourier transform unit
16 channel estimation unit
17 equalization unit
18 error correction unit
19 decode unit
20 display device
30 first channel estimation subunit
31 pilot estimation part
32 time interpolation part
40 second channel estimation subunit
50 correlation calculation subunit
51, 51b autocorrelation calculation part
52, 52b cross-correlation calculation part
53 coefficient multiplication part
60, 60a, 60b control subunit
61 interpolation filter evaluation part
$61_1$ to $61_L$ evaluation filter
62 largest value detection part
70, 70b frequency interpolation subunit
71, 71b interpolation filter
101 first filter
102 second filter
103 filter selection part
104, 206 multiplication part
105, 207 subtraction part
106, 208 smallest value detection part
201 first rotation operation part
202 second rotation operation part
203 rotational amount designation part
204 first accumulation part
205 second accumulation part

The invention claimed is:

1. A receiver that receives a transmission signal, which has been generated by multiplexing a plurality of modulated carriers, and demodulates the received transmission signal, the receiver comprising:
 a Fourier transform unit operable to (i) perform Fourier transform on the received transmission signal and (ii) output the transformed transmission signal;
 a first channel estimation unit operable to (i) estimate channel characteristics based on first signals included in the transformed transmission signal, and (ii) output the estimated channel characteristics as first output signals;
 a second channel estimation unit operable to (i) estimate channel characteristics based on second signals included in the transformed transmission signal, and (ii) output the estimated channel characteristics as second output signals;
 an interpolation unit operable to interpolate the first output signals by performing, on the first output signals, filter processing according to a controlled transfer function;
 a correlation calculation unit operable to perform correlation calculations on the first output signals and the second output signals; and
 a control unit operable to control the transfer function of the interpolation unit in accordance with results of the correlation calculations.

2. The receiver of claim 1, wherein
the correlation calculation unit includes:
 an autocorrelation calculation subunit operable to (i) calculate autocorrelations of the first output signals and (ii) output autocorrelation signals indicating results of the autocorrelation calculation; and
 a cross-correlation calculation subunit operable to (i) calculate cross-correlations of the first output signals and the second output signals and (ii) output cross-correlation signals indicating results of the cross-correlation calculation, and
the control unit controls the transfer function of the interpolation unit in accordance with the autocorrelation signals and the cross-correlation signals.

3. The receiver of claim 2, wherein
the control unit includes:
 an interpolation filter evaluation subunit operable to (i) estimate, in one-to-one correspondence with a plurality of candidate transfer functions, powers of signals output from the interpolation unit by using the autocorrelation signals and the cross-correlation signals, and (ii) output each of the estimated powers; and
 a largest value detection subunit operable to (i) detect a largest estimated power from among the estimated powers output from the interpolation filter evaluation subunit, and (ii) control the transfer function of the interpolation unit in accordance with the candidate transfer function corresponding to the detected largest estimated power.

4. The receiver of claim 2, wherein
the control unit includes:
a first filter subunit operable to (i) perform filter processing on the autocorrelation signals according to each of a plurality of candidate transfer functions, and (ii) output the filtered autocorrelation signals in one-to-one correspondence with the plurality of candidate transfer functions;
a second filter subunit operable to (i) perform filter processing on the cross-correlation signals according to each of the plurality of candidate transfer functions, and (ii) output the filtered cross-correlation signals in one-to-one correspondence with the plurality of candidate transfer functions;
an error calculation subunit operable to (i) calculate, in one-to-one correspondence with the plurality of candidate transfer functions, errors in signals output from the interpolation unit by using the filtered autocorrelation signals and the filtered cross-correlation signals, and (ii) output the calculated errors; and
a smallest value detection subunit operable to (i) detect a smallest error from among the calculated errors output from the error calculation subunit, and (ii) control the transfer function of the interpolation unit in accordance with the candidate transfer function corresponding to the detected smallest error.

5. The receiver of claim 1, wherein
the correlation calculation unit includes:
a coefficient multiplication subunit operable to (i) multiply the first output signals by coefficients based on a reference transfer function of the interpolation unit, and (ii) output the multiplied first signals;
an autocorrelation calculation subunit operable to (i) calculate autocorrelations of the multiplied first output signals and (ii) output autocorrelation signals indicating results of the autocorrelation calculation; and
a cross-correlation calculation subunit operable to (i) calculate cross-correlations of the multiplied first output signals and the second output signals and (ii) output cross-correlation signals indicating results of the cross-correlation calculation, and
the control unit controls the transfer function of the interpolation unit in accordance with the autocorrelation signals and the cross-correlation signals.

6. The receiver of claim 5, wherein
the control unit includes:
a first rotation operation subunit operable to (i) perform rotation operations on the autocorrelation signals in accordance with each of a plurality of candidate rotational amounts, and (ii) output the rotated autocorrelation signals in one-to-one correspondence with the plurality of candidate rotational amounts;
a first accumulation subunit operable to accumulate the rotated autocorrelation signals in one-to-one correspondence with the plurality of candidate rotational amounts;
a second rotation operation subunit operable to (i) perform rotation operations on the cross-correlation signals in accordance with each of the plurality of candidate rotational amounts, and (ii) output the rotated cross-correlation signals in one-to-one correspondence with the plurality of candidate rotational amounts;
a second accumulation operation subunit operable to accumulate the rotated cross-correlation signals in one-to-one correspondence with the plurality of candidate rotational amounts;
an error calculation subunit operable to (i) calculate, in one-to-one correspondence with the plurality of candidate rotational amounts, errors in signals output from the interpolation unit by using (a) the rotated autocorrelation signals that have been accumulated and output by the first accumulation subunit, and (b) the rotated cross-correlation signals that have been accumulated and output by the second accumulation subunit, and (ii) output the calculated errors; and
a smallest value detection subunit operable to (i) detect a smallest error from among the errors output from the error calculation subunit, and (ii) control the transfer function of the interpolation unit by controlling a central position of the reference transfer function of the interpolation unit in accordance with the candidate rotational amount corresponding to the detected smallest error.

7. The receiver of claim 1, wherein
the first channel estimation unit includes a pilot estimation subunit operable to (i) estimate the channel characteristics at first signal positions in accordance with the first signals included in the transmission signal, and (ii) output the estimated channel characteristics at the first signal positions.

8. The receiver of claim 7, wherein
the first channel estimation unit further includes a time interpolation subunit operable to (i) interpolate, in a time direction, the estimated channel characteristics at the signal positions of the first signals, and (ii) output results of the interpolation as the first output signals.

9. The receiver of claim 1, wherein
the first signals are scattered pilot signals.

10. The receiver of claim 1, wherein
the second signals are one of (i) TMCC (Transmission and Multiplexing Configuration Control) signals, (ii) AC (Auxiliary Channel) signals, (iii) TPS (Transmission Parameters Signaling) signals, and (iv) continual pilot signals.

11. The receiver of claim 1, wherein
the second signals include one of the following sets (i) through (v): (i) TMCC (Transmission and Multiplexing Configuration Control) signals and AC (Auxiliary Channel) signals; (ii) TMCC signals and continual pilot signals; (iii) AC signals and continual pilot signals; (iv) TMCC signals, AC signals and continual pilot signals; and (v) TPS (Transmission Parameters Signaling) signals and continual pilot signals.

12. An integrated circuit that receives a transmission signal, which has been generated by multiplexing a plurality of modulated carriers, and demodulates the received transmission signal, the integrated circuit comprising:
a Fourier transform unit operable to (i) perform Fourier transform on the received transmission signal and (ii) output the transformed transmission signal;
a first channel estimation unit operable to (i) estimate channel characteristics based on first signals included in the transformed transmission signal, and (ii) output the estimated channel characteristics as first output signals;
a second channel estimation unit operable to (i) estimate channel characteristics based on second signals included in the transformed transmission signal, and (ii) output the estimated channel characteristics as second output signals;

an interpolation unit operable to interpolate the first output signals by performing, on the first output signals, filter processing according to a controlled transfer function;

a correlation calculation unit operable to perform correlation calculations on the first output signals and the second output signals; and a control unit operable to control the transfer function of the interpolation unit in accordance with results of the correlation calculations.

13. A digital television receiver that receives a transmission signal, which has been generated by multiplexing a plurality of modulated carriers, and demodulates the received transmission signal, the digital television receiver comprising:

a Fourier transform unit operable to (i) perform Fourier transform on the received transmission signal and (ii) output the transformed transmission signal;

a first channel estimation unit operable to (i) estimate channel characteristics based on first signals included in the transformed transmission signal, and (ii) output the estimated channel characteristics as first output signals;

a second channel estimation unit operable to (i) estimate channel characteristics based on second signals included in the transformed transmission signal, and (ii) output the estimated channel characteristics as second output signals;

an interpolation unit operable to interpolate the first output signals by performing, on the first output signals, filter processing according to a controlled transfer function;

a correlation calculation unit operable to perform correlation calculations on the first output signals and the second output signals; and a control unit operable to control the transfer function of the interpolation unit in accordance with results of the correlation calculations.

14. A reception method used in a receiver that receives a transmission signal, which has been generated by multiplexing a plurality of modulated carriers, and demodulates the received transmission signal, the reception method comprising the steps of:

performing Fourier transform on the received transmission signal, and outputting the transformed transmission signal;

estimating channel characteristics based on first signals included in the transformed transmission signal, and outputting the estimated channel characteristics as first output signals;

estimating channel characteristics based on second signals included in the transformed transmission signal, and outputting the estimated channel characteristics as second output signals;

interpolating the first output signals by performing, on the first output signals, filter processing according to a controlled transfer function;

performing correlation calculations on the first output signals and the second output signals; and controlling the transfer function associated with the interpolating step in accordance with results of the correlation calculations.

15. A non-transitory computer-readable recording medium which stores a program for causing a receiver, which (i) receives a transmission signal generated by multiplexing a plurality of modulated carriers and (ii) demodulates the received transmission signal, to execute steps comprising:

performing Fourier transform on the received transmission signal, and outputting the transformed transmission signal;

estimating channel characteristics based on first signals included in the transformed transmission signal, and outputting the estimated channel characteristics as first output signals;

estimating channel characteristics based on second signals included in the transformed transmission signal, and outputting the estimated channel characteristics as second output signals;

interpolating the first output signals by performing, on the first output signals, filter processing according to a controlled transfer function;

performing correlation calculations on the first output signals and the second output signals; and controlling the transfer function associated with the interpolating step in accordance with results of the correlation calculations.

* * * * *